United States Patent
Bodnar

(10) Patent No.: US 9,618,911 B2
(45) Date of Patent: *Apr. 11, 2017

(54) AUTOMATION OF A PROGRAMMABLE DEVICE

(71) Applicant: Velvetwire, Santa Cruz, CA (US)

(72) Inventor: Eric O. Bodnar, San Francisco, CA (US)

(73) Assignee: Velvetwire LLC, Santa Cruz (AE)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,288

(22) Filed: Sep. 30, 2014

(65) Prior Publication Data

US 2015/0018982 A1   Jan. 15, 2015

Related U.S. Application Data

(63) Continuation of application No. 12/629,865, filed on Dec. 2, 2009, now Pat. No. 8,849,462.

(51) Int. Cl.
G05D 23/19 (2006.01)
G05B 13/02 (2006.01)
G05B 15/02 (2006.01)
G06N 99/00 (2010.01)

(52) U.S. Cl.
CPC ....... *G05B 13/0265* (2013.01); *G05B 13/026* (2013.01); *G05B 15/02* (2013.01); *G05D 23/19* (2013.01); *G05D 23/1904* (2013.01); *G06N 99/005* (2013.01); *G05B 2219/25377* (2013.01); *G05B 2219/2614* (2013.01); *G05B 2219/2642* (2013.01)

(58) Field of Classification Search
None
See application file for complete search history.

(56) References Cited

U.S. PATENT DOCUMENTS

| 4,516,213 A | 5/1985 | Gidden |
| 4,706,882 A | 11/1987 | Barnard |
| 5,088,645 A | 2/1992 | Bell |
| 5,127,575 A | 7/1992 | Beerbaum |
| 5,165,465 A | 11/1992 | Kenet |
| 5,219,119 A | 6/1993 | Kasper et al. |

(Continued)

FOREIGN PATENT DOCUMENTS

| EP | 0 614 088 | 9/1994 |
| WO | WO 2008/064410 | 6/2008 |

OTHER PUBLICATIONS

Boehret, Katherine, "A Gadget for the Home Learns by Degrees," <http://allthingsd.com/20111025/a-gadget-for-the-home-learns-by-degree- s/>, Published Oct. 25, 2011, 4 pages.

(Continued)

*Primary Examiner* — Ryan Jarrett
(74) *Attorney, Agent, or Firm* — HIPLegal LLP; Judith Szepesi

(57) ABSTRACT

A method and apparatus for a computer-implemented adaptive automation module comprising an event recorder to store one or more events for a predetermined period, and a timeline pattern generator logic to create a timeline for the predetermined period. The module further comprising marker creator logic to generate a marker to abstract the timeline data from the event data for controlling a device.

18 Claims, 25 Drawing Sheets

(56) References Cited

U.S. PATENT DOCUMENTS

| | | |
|---|---|---|
| 5,344,068 A | 9/1994 | Haessig |
| 5,395,042 A | 3/1995 | Riley et al. |
| 5,563,455 A | 10/1996 | Cheng |
| 5,821,924 A | 10/1998 | Kikinis et al. |
| 6,066,843 A | 5/2000 | Scheremeta |
| 6,108,614 A | 8/2000 | Lincoln et al. |
| 6,263,260 B1 | 7/2001 | Bodmer et al. |
| 6,298,315 B1 | 10/2001 | Li et al. |
| 6,375,087 B1 | 4/2002 | Day et al. |
| 6,415,205 B1 | 7/2002 | Myron |
| 6,586,849 B2 | 7/2003 | Tarr |
| 6,975,958 B2 | 12/2005 | Bohrer et al. |
| 7,132,763 B2 | 11/2006 | Rendic |
| 7,142,948 B2 | 11/2006 | Metz |
| 7,159,789 B2 | 1/2007 | Schwendinger et al. |
| 7,159,790 B2 | 1/2007 | Schwendinger et al. |
| 7,193,335 B2 | 3/2007 | Palmer et al. |
| 7,476,988 B2 | 1/2009 | Mulhouse et al. |
| 7,584,899 B2 | 9/2009 | De Pauw et al. |
| 7,622,822 B2 | 11/2009 | Gelonese |
| 7,634,504 B2 | 12/2009 | Amundson |
| 7,688,322 B2 | 3/2010 | Kapler et al. |
| 8,849,462 B2 * | 9/2014 | Bodnar .............. G05B 13/026 700/276 |
| 2003/0009401 A1 | 1/2003 | Ellis |
| 2003/0073342 A1 | 4/2003 | Geyer |
| 2004/0069768 A1 | 4/2004 | Patterson |
| 2005/0080601 A1 | 4/2005 | Wren |
| 2005/0246119 A1 | 11/2005 | Koodali |
| 2006/0167825 A1 | 7/2006 | Sayal |
| 2006/0182458 A1 | 8/2006 | Hall et al. |
| 2007/0053513 A1 | 3/2007 | Hoffberg |
| 2008/0046387 A1 | 2/2008 | Gopal et al. |
| 2008/0106148 A1 | 5/2008 | Gelonese |
| 2008/0261453 A1 | 10/2008 | Chen |
| 2009/0045804 A1 | 2/2009 | Durling et al. |
| 2009/0052372 A1 | 2/2009 | Durazzo et al. |
| 2009/0100275 A1 | 4/2009 | Chang et al. |
| 2009/0195349 A1 | 8/2009 | Frader-Thompson |
| 2009/0235107 A1 | 9/2009 | Gelonese |
| 2009/0289501 A1 | 11/2009 | Garb |
| 2010/0095146 A1 | 4/2010 | Gelonese |
| 2010/0231043 A1 | 9/2010 | Hu |
| 2011/0216452 A1 | 9/2011 | Haines et al. |

OTHER PUBLICATIONS

Fenlon, Wesley, "How the Nest Actually Differs from Other Smart Thermostats," <http://www.tested.com/news/how-the-nest-actually-differs-from-other-s- mart-thermostats/3067/>, Dated Oct. 25, 2011, 2 pages.

Frost & Sullivan: Honeywell Chosen by Consumers as the Overall Best Brand of Programmable Thermostats in the United States, www.fueloilnews.com Dated Sep. 20, 2011, 1 page.

Complaint and Demand for Jury Trial, *Honeywell International, Inc.* vs. *Nest Labs, Inc., and Best Buy Co., Inc.*, Case No. 0:2012cv00299, Minnesota District Court, Feb. 6, 2012, 29 pages.

PCT/US2010/058611, International Preliminary Report on Patentability, Date of Mailing Jun. 14, 2012, 7 pages.

Embertec Honored in CES 2010 Innovations Awards!, Dated Oct. 22, 2009, http://www.embertec.com/default.asp?PageID=9&ReleaseID=13&Display=True, 2 pages.

PCT/US2010/058611, International Search Report and Written Opinion, mailing date Jan. 21, 2011, 14 pages.

Moses, Asher, "Smart Plugs Cut Costs, Energy Use," <http://www.smh.com.au/action/printArticle?id=1017849>, Published Jan. 6, 2010, 2 pages.

Supplementary European Search Report and Search Opinion for European App. No. EP 10 83 5083, mailed Jul. 24, 2014, 9 pages.

EP10835083.6 Office Action, mailed Jan. 7, 2016, 4 pages.

Molina J M et al, "Segmentation and Classification of Time-Series: Real Case Studies", Sep. 23, 2009, Intelligent Data Engineering and Automated Learning—Ideal 2009. Springer Berlin Heidelberg, Berlin Heidelberg, pp. 743-750, XP019130942, ISBN: 978-3-642-04393-2.

Ben Choi et al. "Applying Machine Learning Methods for Time Series Forecasting", XP055306146, Proceedings of the IASTED International Conference Artificial Intelligence and Applications (AIA 2009), Feb. 16-18, 2009, Innsbruck, Austria, 6 pages.

EP10835083.6, Examination Report, Date of mailing: Oct. 7, 2016, 8 pages.

* cited by examiner

| Relative Humidity | Air Temperature (Degrees F) | | | | | | | |
|---|---|---|---|---|---|---|---|---|
| | 70 | 75 | 80 | 85 | 90 | 95 | 100 | 105 |
| 0% | 64 | 69 | 73 | 78 | 83 | 87 | 91 | 95 |
| 10% | 65 | 70 | 75 | 80 | 85 | 90 | 95 | 100 |
| 20% | 66 | 72 | 77 | 82 | 87 | 93 | 99 | 105 |
| 30% | 67 | 73 | 78 | 84 | 90 | 96 | 104 | 113 |
| 40% | 68 | 74 | 79 | 86 | 93 | 101 | 110 | 123 |
| 50% | 69 | 75 | 81 | 88 | 96 | 107 | 120 | 135 |
| 60% | 70 | 76 | 82 | 90 | 100 | 114 | 132 | 149 |
| 70% | 70 | 77 | 85 | 93 | 106 | 124 | 144 | |
| 80% | 71 | 78 | 86 | 97 | 113 | 136 | 157 | |
| 90% | 71 | 79 | 88 | 102 | 122 | 150 | 170 | |
| 100% | 72 | 80 | 91 | 108 | 133 | 166 | | |

Fig. 15G

AUTOMATION OF A PROGRAMMABLE DEVICE

RELATED APPLICATIONS

The present application is a continuation of U.S. patent application Ser. No. 12/629,865, filed Dec. 2, 2009, now issued as U.S. Pat. No. 8,849,462, issued on Sep. 30, 2014.

FIELD OF THE INVENTION

The present invention relates to a programmable device, and more particularly to automation of a programmable device.

BACKGROUND

Energy prices have risen dramatically in recent years. Additionally, the public has become increasingly aware of the environmental impact of large-scale energy production and distribution. Both companies and individuals are looking for solutions to address escalating energy costs, as well as mitigating environmental impact through reduced energy consumption.

Heating, cooling, and lighting of residential and commercial buildings are major elements of overall energy consumption within the economy, and significant contributors to the energy costs for individuals and businesses. Energy required for residential and commercial buildings can be reduced through behavior modification by, for example, reducing heating and cooling during off-hours and turning off lights when not needed. However, the problem with behavior modification is that, even with the best intentions, people find it difficult to change their habits.

Governmental and environmental organizations have suggested, and in some cases even mandated, that the public use programmable energy saving devices, such as programmable setback thermostats, to reduce energy consumption. However, these devices have a minimal beneficial effect on energy savings because they are either improperly programmed or are not programmed at all.

To date, methods that attempt to address the problem fall into one of two basic categories, reactive and predictive. Reactive methods drive an output in reaction to receiving an input, such as a signal from an artificial light sensor or motion sensor. During periods lacking input, reactive methods, often after a time delay, enter into a setback or energy saving mode. Upon receiving input, these methods revert to normal operation. Predictive methods, on the other hand, gather and tabulate input and attempt to schedule output changes according to a derived schedule. Reactive methods can lead to occupant discomfort by driving rapid output change in response to input while predictive methods can lead to mistimed output due to faulty prediction.

The reactive method described by Riley (U.S. Pat. No. 5,395,042) attempts to mitigate the severity of reactive output, in this case heating and cooling, by controlling tolerances in order to minimize recovery time. For instance, the system can be programmed to allow a temperature drift no greater than that which can be restored within a given time period (e.g., 15 minutes).

The predictive method described by Day-Theuer (U.S. Pat. No. 6,375,087) yields poor scheduling results. In particular, the apparatus of Day-Theuer can be easily confused by sporadic sensor events outside the norm because it correlates all sensor events equally The predictive method described by Bell (U.S. Pat. No. 5,088,645) attempts to solve the problem of unusual occurrences by linking output levels directly to the frequency of time-aligned historical inputs. However, this method has very undesirable consequences due to the association between input frequency and output level. Sporadic input by sensors located in low traffic areas, hallways for instance, will produce instability in the method and lead to severe output oscillations.

Bodmer (U.S. Pat. No. 6,263,260) describes a method relying on neural networks to perform a stochastic analysis of sensor data in order to generate better predictive output. Unfortunately, neural networks require tremendous parallel computing power and significant memory resources. This requirement is counterproductive, as more energy may be required to implement the method than the amount of energy saved.

SUMMARY

A computer-implemented adaptive automation module comprising an event recorder to store one or more events for a predetermined period, and a timeline pattern generator logic to create a timeline for the predetermined period. The module further comprising marker creator logic to generate a marker to abstract the timeline data from the event data for controlling a device.

Other features of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which:

FIG. 15G illustrates one embodiment of a heat index chart; and

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

The method and apparatus of the present invention involves an adaptive automation module to automatically set a programmable controller, such as a programmable thermostat. This can be done to optimize heating and cooling, and potentially produce energy savings. The programmable controller may include a thermostat, water heater, illumination controller, irrigation controller, appliance controller, or other device.

An automation time schedule is created by using historical sensor data to derive one or more timeline markers that delineate transitional patterns within the data. In one embodiment, this is done by qualifying the historical data, and quantifying the level of confidence in predictability of future behavior based on of the historical data. The markers reflect historical transitions, and predict future transitions from one mode to the next within a continuous revolving time schedule. The markers deliver a superior input to automation scheduling algorithms without the undesired side effects of previous time-alignment methods. Moreover, neither intense computational power nor significant quantities of memory and storage are required. Furthermore, the markers can be easily re-synchronized in the event of a power loss because they are a derived product of the historical data, even if the historical data itself is lost. The automation may further be adjusted in light of external data, such as weather, spot pricing of power, data from other adaptive automation modules, etc.

Figure 1:
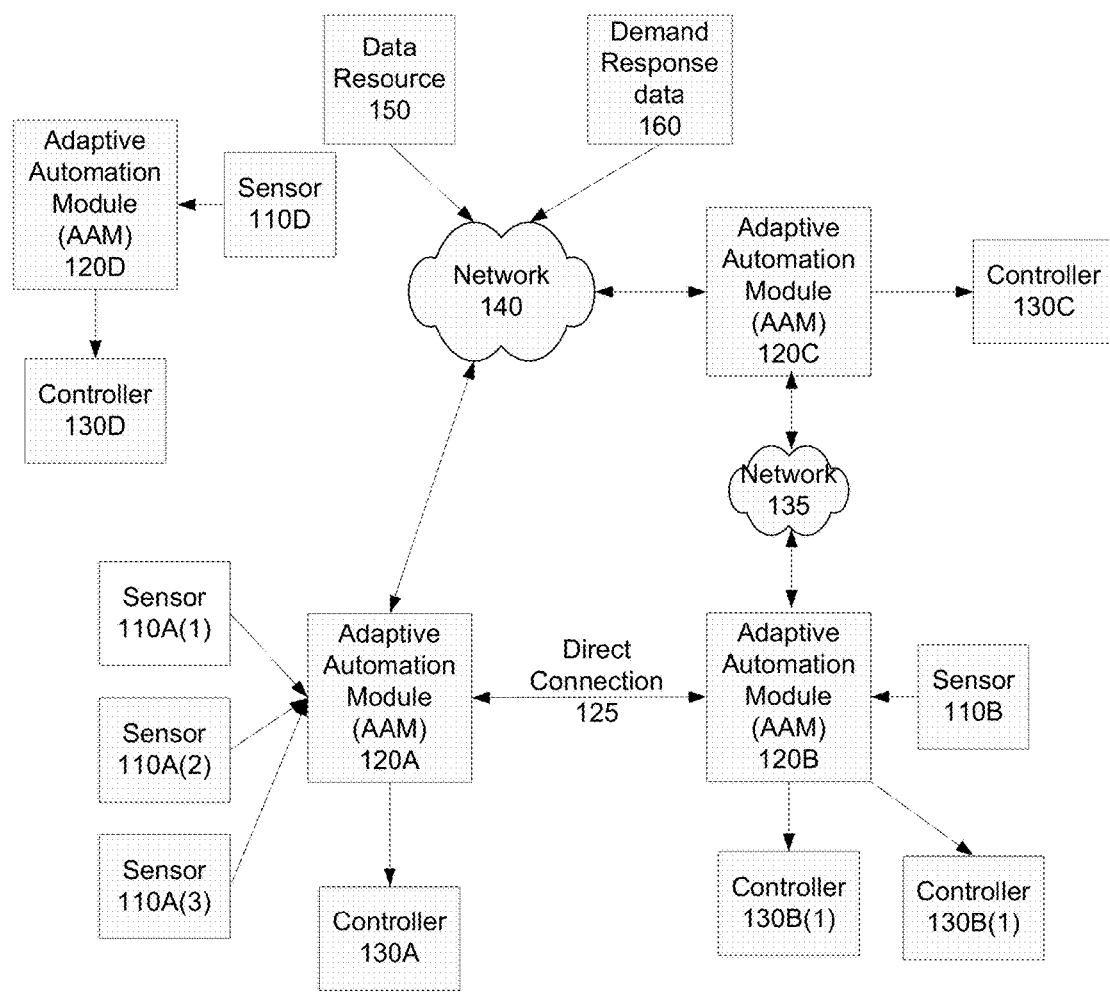
FIG. 1 is a block diagram of one embodiment of a network including adaptive automation modules.

FIG. 1 is a block diagram of one embodiment a system including one or more adaptive automation modules. Each adaptive automation module 120A, B, C, D is coupled to a controller 130 A, B(1), B(2), C, D which controls a device. In one embodiment the device is related to an environmental factor, such as temperature, heating, lights, irrigation, etc. These controls may be in a residential household, commercial environment, or other location. In one embodiment, a single automation module 120B can be connected to multiple controllers 130B(1), (2). For example, a single lighting module could control multiple circuits.

An adaptive automation module 120A may be coupled, directly or indirectly, to multiple sensors 110A(1), (2), (3). These sensors 110A(1), (2), (3) receive data regarding the locality. The sensors 110A(1), (2), (3) may include occupancy sensors, e.g. light switch sensors, proximity sensors, door/window opening sensors, motion sensors, manually controlled presence indicators, heat sensors, etc. The sensors 110A(1), (2), (3) may include environmental data sensors such as thermometers, barometers, light meters (which may distinguish between natural and artificial light), humidity sensors, or other sensors which provide ambient data. However, as shown with adaptive automation module 120C no sensors need to be connected to an adaptive automation module 120C. The module 120C may receive its data via a network 135, 140 or direct connection 125 to another module.

An adaptive automation module 120A may be coupled to external data sources, such as data resource 150, and demand response data source 160. These data sources may be accessed via a network 140. The network 140 may be the Internet, a wireless network, a local area network, a ZIGBEE™ network, etc. For example, in one embodiment, the adaptive automation module 120A may receive data from a ZIGBEE™ enabled power meter, which provides dynamic pricing data for energy. Other network-provided data may include external data (e.g. time, weather, etc.) or local data. Local data may include data from other automation modules, or sensors coupled to other automation modules.

In some instances, separate controllers' outputs may both contribute to the user's perception of the environment. For example, humidity and temperature interact to give an overall heat index. Therefore, in an environment where a first adaptive automation module controls humidity, and a second one controls temperature, the two adaptive automation modules interact. In one embodiment, one adaptive automation module receives data from another, and can adjust its own settings based on that data. In another embodiment, both adaptive automation modules communicate their state to each other, and arrive at a joint decision.

As shown in FIG. 1, in one embodiment an adaptive automation module 120D may include a single sensor 110D, and control a single controller 130D. On the other hand, the adaptive automation module 120B may include multiple controllers 130B(1), (2), or multiple sensors 110A(1), (2), (3). In one embodiment, it may have no sensors at all, as shown in module 120C, but instead get its data from another module 120B, or via a network 140, 145. At its simplest, the adaptive automation module has a data source for information, and controls one controller.

Figure 2:
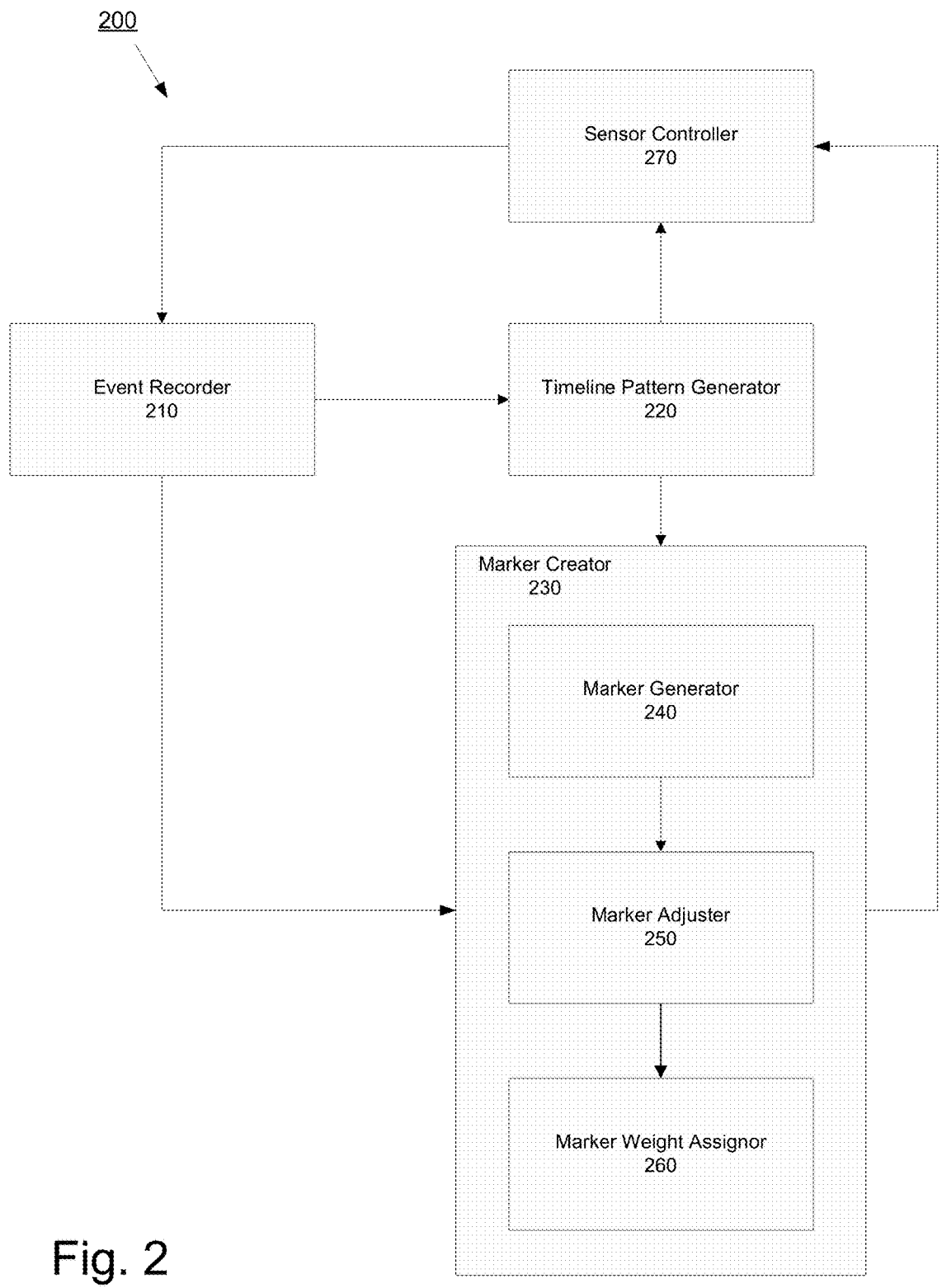
FIG. 2 illustrates a block diagram of one embodiment of the an adaptive automation module.

FIG. 2 is a block diagram of one embodiment of an adaptive automation module. System 200 in one embodiment includes event recorder 210, sensor controller 270, timeline pattern generator 220, and marker creator 230. Within marker creator 230, in one embodiment there is a marker generator 240, marker adjuster 250, and marker weight assignor 260. In other embodiments, components 240, 250, and 260 can be separate from and not part of marker creator 240.

Event recorder 210 has as its inputs one or more events from one or more sensors. In one embodiment, the events are received as data from one or more motion sensors, proximity sensors, light switches, door sensors, manually controlled presence indicators, or other sensors able to indicate the presence of someone in the environment. In one embodiment, sensor data may also include data from one or more of a barometric sensor, an ambient light sensor, humidity sensor, or any other sensor able to provide environmental data. In one embodiment, event recorder may further receive data from other sensors or controllers, or external data regarding the environment, costs, Demand Response data from utility companies, or other relevant information via a network such as the Internet. In one embodiment, event recorder 210 stores the events in a flash memory or other non-volatile storage. In another embodiment, volatile memory such as random access memory (RAM) may be used.

In one embodiment, the event recorder 210 summarizes the input events using a granular timeline in order to remove the risk of unbounded event arrays, prior to storing the event data. In one embodiment, the level of granularity is chosen to balance the desired level of detail against memory constraints. In one embodiment, the granularity is one hour, in a twenty-four hour day cycle.

Timeline pattern generator 220 receives event information from event recorder 210. In one embodiment, timeline pattern generator 220 combines the received event information with previous event information to create a histogram.

In one embodiment, the oldest event information is discarded from the histogram. In an alternate embodiment, no event information is discarded. Once the histogram has been updated, the histogram is collapsed to produce a single revolving timeline pattern, summarizing event history. In one embodiment, the revolving timeline pattern represents a 24-hour period. In another embodiment, the timeline patterns may represent a 7-day period (e.g. 168 hour period).

In one embodiment, the timeline pattern is passed through a binary low-pass filter to remove small oscillations from the pattern.

Marker creator 230 receives the timeline pattern. In one embodiment, marker creator 230 includes marker generator 240, marker adjuster 250, and marker weight assignor 260. Marker generator 240 establishes the number and placement of initial timeline markers using the timeline pattern received from timeline pattern generator 220.

Marker adjuster 250 assigns a polarity to each of the markers. In one embodiment, the polarity is assigned based on whether the marker marks the start or the end of a stretch of activity in the timeline pattern. In one embodiment, marker adjuster 250 time-adjusts each marker using data from the histogram to reflect variation in the pattern over time. This adjustment can be referred to as adjusting for location consistency.

Marker weight assignor 260 assigns a weight to each of the markers using the precision of time alignment between the derived markers and contributing events in the histogram. In one embodiment, the assigned weights reflect a level of consistency, and thereby the level of predictability, of each of the markers in the historical record of events. This adjustment can be referred to as adjusting for time consistency. The precision of time alignment increases the weighting of a marker.

Once markers have been created by marker creator 230, markers are used by sensor controller 270 to control the programmable device. In one embodiment, the markers created by marker creator 230 are stored in non-volatile memory. The creation of the marker can be thought of as a way to abstract the timeline data from the actual event data. The markers are an intermediate data set between the event record, as indicated by the timeline, and the factors driving automation. By utilizing a derived intermediate data set of markers, the controls are not as vulnerable to miscalculations and variations which are the natural outcome of sporadic input.

Figure 3A:
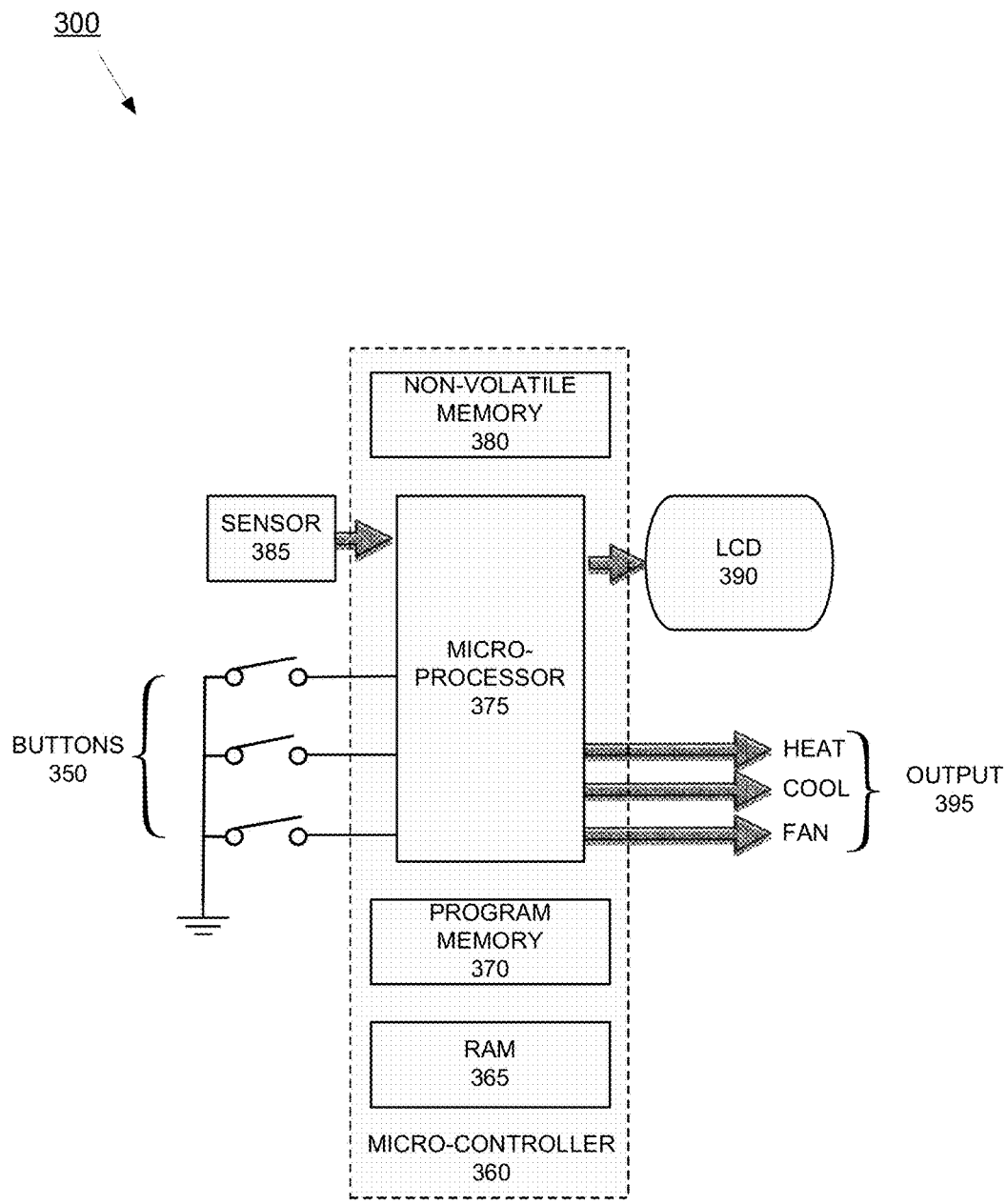
FIG. 3A illustrates an exemplary hardware implementation of a thermostat in accordance with the present invention.

FIG. 3A illustrates one embodiment of a hardware implementation of a thermostat in accordance with the present invention. The thermostat in one embodiment includes at least one control accessible to a user, shown as buttons 350. In one embodiment, the buttons 350 may be: increase temperature, decrease temperature, and off. The microcontroller 360 is the core of the thermostat, and includes a micro-processor 375, non-volatile memory 380, and program memory 370. Program memory 370 may be stored in non-volatile memory such as EEPROMs (Electrically Erasable Programmable Read-Only Memory), permitting updating of the program. Non-volatile memory 380 may be used to store markers, and other stable data. In one embodiment, a volatile memory 365 may be included as well to store timeline data, and other data that need not be stored long term. In another embodiment, non-volatile memory 380 may be used to store intermediate data as well.

In one embodiment, the microprocessor 375 sends out control data to outputs 395. In one embodiment, for a standard thermostat the outputs may be heat, cool, and fan. The microprocessor 375 may also provide an interface to users via LCD 390. In one embodiment, buttons 350 may be replaced by a touch-sensitive LCD 395, providing soft buttons for control. Other ways of implementing an input and/or output may be utilized. In one embodiment, no output is provided to the user.

The micro-controller 360 receives as an input data from sensors 385 or other outside sources (not shown) which may include other adaptive automation modules, a network, additional sensors, or other data sources. In one embodiment, the sensor data is buffered either within the microcontroller 360 or within the sensor 385.

Figure 3B:
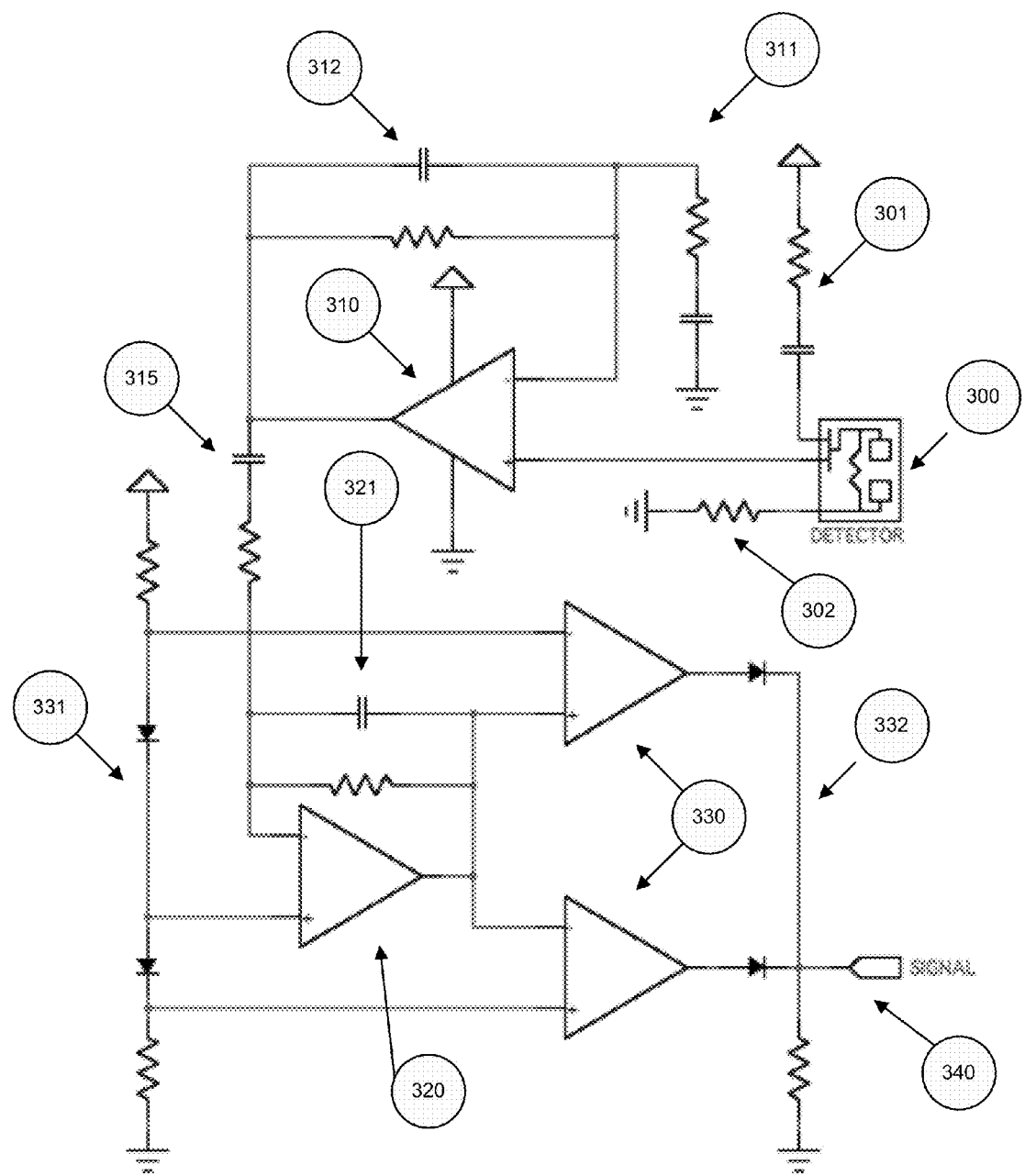
FIG. 3B exemplifies a motion activated occupancy sensor circuit that can be used to supply occupancy signals to a digital microcontroller.

FIG. 3B exemplifies a motion activated occupancy sensor circuit that can be used to supply occupancy signals to a digital microcontroller. In one embodiment, a highly sensitive dual-element pyroelectric sensor 300 senses infrared radiation produced by human body heat. By surrounding the sensor with a broad focusing element, such as a Fresnel lens in one embodiment, any motion by occupants will produce slightly different infrared readings on the two closely situated sensing elements within pyroelectric sensor 300.

Current flows through the sensor via filtered positive supply 301 and pull down resistor 302. Field effect transistor circuitry within sensor 300 outputs a voltage signal reflecting the measured difference between the two sensing elements. The sensor output signal is then fed to operational amplifier 310. Because the signal produced by sensor 300 is potentially very small, it may be necessary to amplify it. In one embodiment, the signal is amplified by five orders of magnitude. This amount of amplification may be too large to be done using a single amplification stage without introducing instability. For this reason, in one embodiment, multistage amplification is used.

Operational amplifier 310 forms the first stage in a two-stage amplification system. The resistor capacitor combination 311 provides biasing to amplifier 310. High-pass filter 312 is used to reject low frequency noise, such as that produced by artificial lighting. The resistance values of bias element 311 and filter 312 form the basis for the gain stage of amplifier 310.

Output from amplifier 310 is fed through DC rejection filter 315. This removes any steady state element, such as sunlight radiation, from the signal. The filtered signal is then fed to operational amplifier 320, which forms the second stage of the two-stage amplification system. High-pass filter 321 further filters the signal to remove any unwanted low-frequency noise. The resistance values of filter 321 and rejection element 315 form the basis for the gain stage of amplifier 320.

The output from amplifier 320 is then fed to a window comparator formed by the amplifier pair 330. Voltage divider network 331 provides the reference voltages for comparison to window comparator 330. Amplified and filtered sensor signals that deviate from the center bias voltage by a value greater than the low-current voltage drop across the diodes in divider network 331 will generate a comparator output signal.

The output from comparator 330 is then fed through rectifier 332 and referenced to ground. The final output signal 340 will produce a positive pulse whenever movement is detected by sensor 300. Motion signal 340 can be fed directly to a digital microcontroller. Motion signal 340 may be used to indicate that someone is in the space. In one embodiment, the motion signal 340 is buffered, and output of the buffer (positive or negative) is determined periodically, for example at 45 minute intervals.

Figure 4:
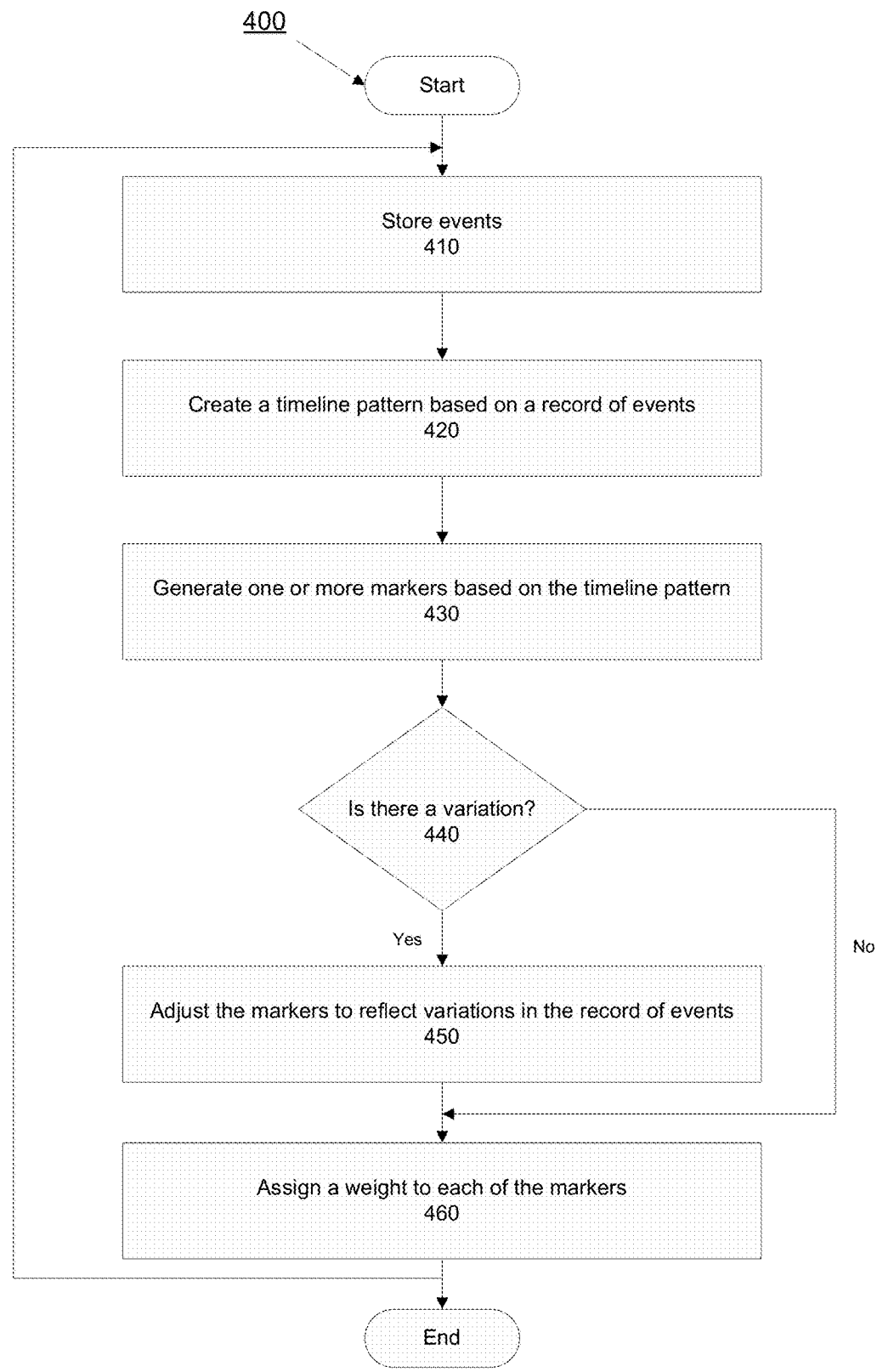
FIG. 4 is an overview flowchart of one embodiment of automation of a programmable device.

FIG. 4 is a flowchart of one embodiment of automation of a programmable device. The process starts at block 410, where one or more events are detected. These events are inputs from the sensors, such as a motion sensor, proximity sensor, light switch sensor, door sensor, etc. The events are stored at block 410. In one embodiment, the sensor events are buffered, and then stored at the end of a cycle of time. In one embodiment, the cycle of time is a period of 24 hours. In one embodiment, the raw event data is not stored. Instead, prior to storage, filters are applied, and the data stored is a granular event indicator. One embodiment of the storage of sensor events is described below in conjunction with FIGS. 5A and 5B.

At block 420, process 400 creates a timeline pattern based on the record of stored events, in one embodiment. In one embodiment, the record of events is a histogram, which is collapsed into the timeline pattern. One embodiment of the creation of the timeline pattern based on the record of events is described below in conjunction with FIG. 6.

At block 430, the process generates one or more markers based on the timeline pattern. One embodiment of the marker generation is described below in conjunction with FIG. 7.

At block 440, the process determines whether there is a variation in the record of events. A variation in the record of events occurs when the newly recorded event, once divided into its granular slot, does not overlap with prior events, or markers. If there is a variation in the record of events, the process continues at block 450. At block 450, the markers are adjusted to reflect these variations in the record of events. One embodiment of the adjustment of markers is described below in conjunction with FIG. 8.

If there is no variation in the markers, and the new event fits into the pattern, the process continues at block 460. At block 460, a weight assigned to the markers is adjusted. One embodiment of the weight assignment is described below in conjunction with FIGS. 9A and 9B. The process then ends. In one embodiment, this process may occur each time a new event is recorded. In another embodiment, the system buffers events for a period, and then performs this adjustment at a later time. In one embodiment, the process performs this adjustment at a time of least utilization. This may be the middle of the night.

Figure 5A:
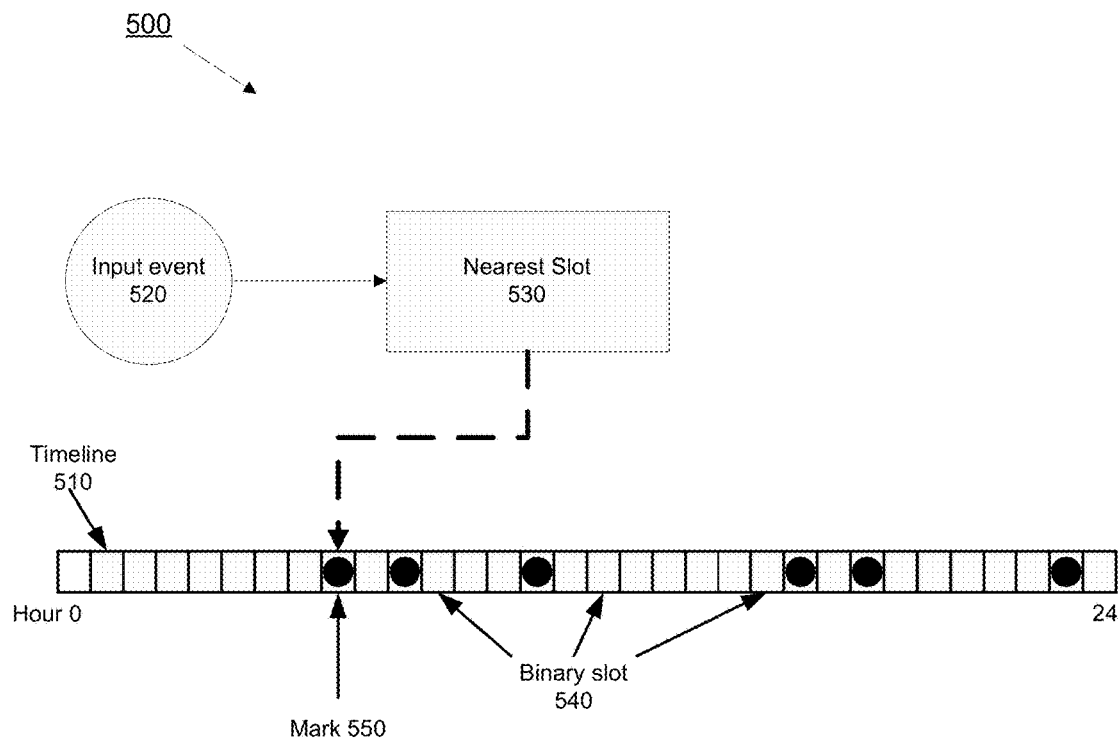
FIG. 5A shows one embodiment of a timeline.

FIG. 5A illustrates one embodiment of a timeline as described above. Timeline 510 illustrates one embodiment of a granular recording sequence. In this embodiment, input event 520 occurs at an arbitrary time. Input event 520 is recorded in the nearest time slot matching the event occurrence, as identified by nearest slot 530.

In one embodiment, timeline 510 represents a 24-hour period of time. Timeline 510 is divided in one embodiment into uniform slots 540. In one embodiment, timeline 510 is divided into 32 binary slots 540, each binary slot 540 representing a period of time of 45 minutes. In another embodiment, the slots may not be uniformly sized. In one embodiment, the slot granularity may depend on a level of activity expected. In one embodiment, the slots are closer together at times when activity is expected and further apart when activity is unexpected. For example, in one embodiment in the morning and evening slots may be 15 minutes long, while in the middle of the night, the slots may be an hour long.

Nearest slot 530 points to binary slot 540 corresponding to the slot in the timeline, which covers the time of the input event 520. A mark 550 in any slot indicates that one or more events occurred during the time encapsulated by the given slot. In one embodiment, a binary mask, rotated by a countdown timer, may be used to align sensor inputs with the proper time slot. An alternate embodiment may use modulo arithmetic for time to slot conversion. In one embodiment, a slot is represented by a single memory bit, which has a value of one if any events occurred during the time period represented by that slot, and otherwise has a value of zero. This reduces the storage requirement for the timeline significantly. In an alternate embodiment, an array of structures is used to record the type and count of events occurring at a given time.

Figure 5B:
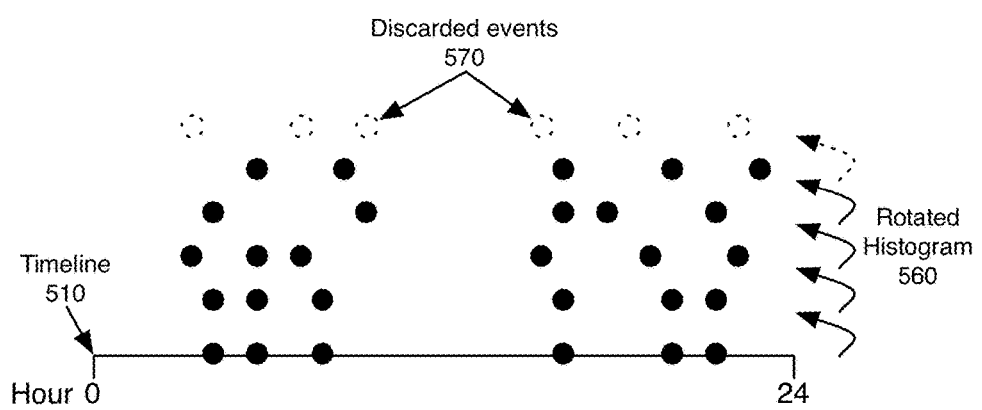
FIG. 5B shows one embodiment of rotation of the histogram.

FIG. 5B illustrates one embodiment of rotating the histogram. In order to perform timeline pattern computations, a histogram of past input events is used. In one embodiment, the histogram uses 32-slot granularity and a depth of 4 days. At the end of every 24-hour cycle, the day's events are transferred to the first day of the histogram, and the remaining days rotated. The last day of the histogram is rotated out and discarded, shown as discarded events 570. Finally, the daily summary is reset based on the new data. Any granularity chosen for the daily event record in one embodiment is matched in the histogram, as shown.

Those skilled in the art will appreciate that there are many ways to implement a rotating histogram. In one embodiment, a memory shift technique may be used. The event listing of day n−1 is transferred to that of day n, day n−2 to n−1, and so on. Finally, the daily summary is transferred to the event listing of day 1. In another implementation, pointer arithmetic may be used. In one embodiment, the pointers to the memory regions for the current and previous days are adjusted by the size of a single region. The pointer for the daily summary is then computed to overlap the oldest, or discarded, region.

Just as the level of granularity of the timeline is up to the discretion of the implementer, so is the depth of the histogram. A deeper histogram will more accurately summarize event patterns over time while a shallower histogram will more readily respond to changes in patterns over time. Furthermore, the implementer may choose to keep parallel histograms for different days of the week. For instance, in one implementation a histogram may record weekday activity while another records weekend activity. In another implementation, a separate histogram may be kept for each day of the week.

Figure 6:
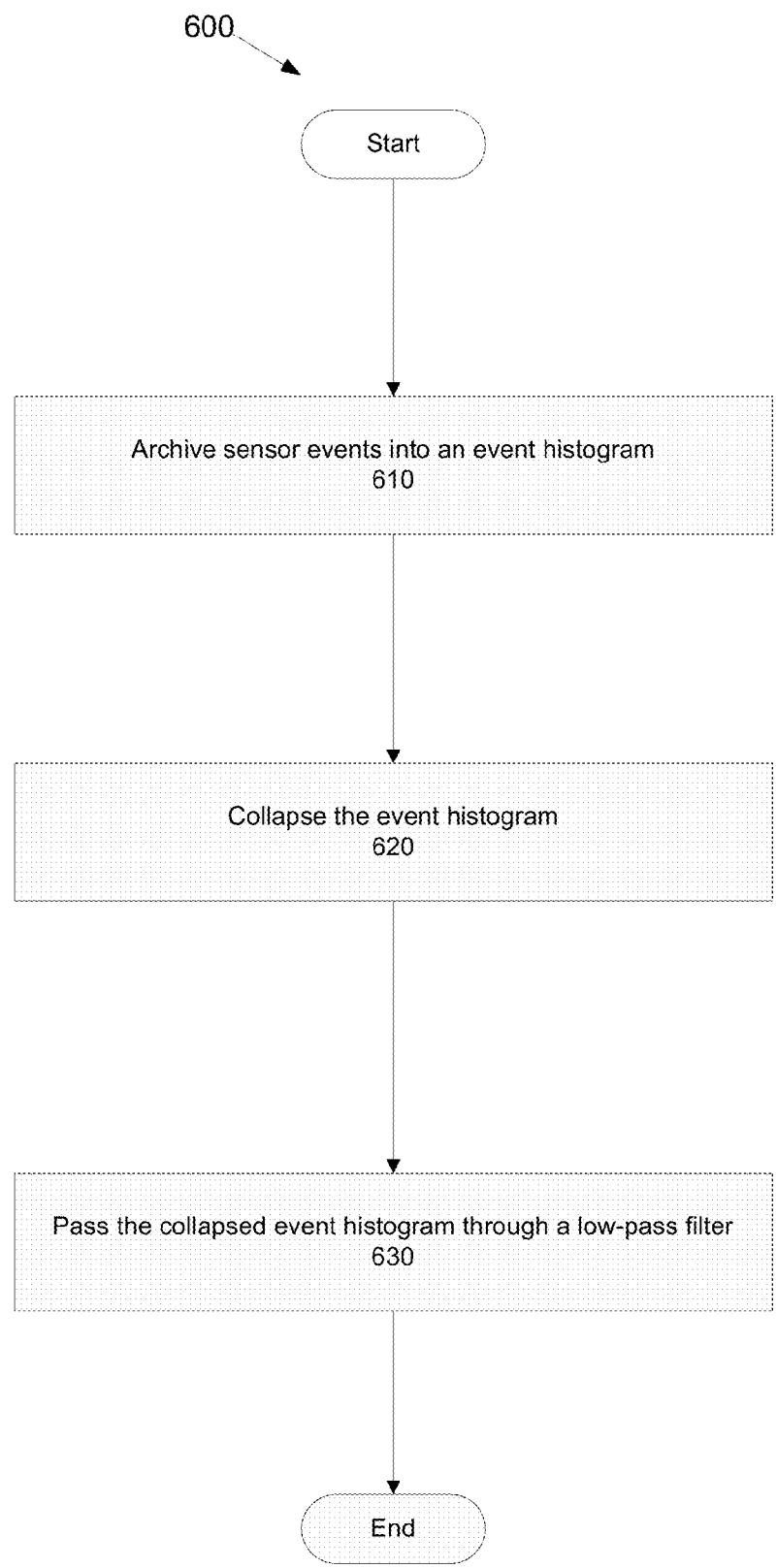
FIG. 6 is a flowchart of timeline pattern creation method in accordance with embodiments of the present invention.

FIG. 6 illustrates a flow diagram of timeline pattern creation method in accordance with embodiments of the present invention. At block 610, sensor events are archived into an event histogram. In one embodiment, the event histogram has a depth of 7 days. In alternate embodiments, the event histogram has a different depth. The greater the depth value of the histogram, the more accurate the timeline pattern and therefore the more accurate the automation schedule. In one embodiment, there is a separate event histogram for each day of the week. In one embodiment, the sensor events are archived at the end of a cycle of time. In one embodiment, the cycle of time is a period of 24 hours.

At the end of every cycle, that cycle's events are transferred to the most recent section of the record of events. In one embodiment, the most recent section of the record of events is the first row of a histogram. The rest of the cycles stored in the record of events are shifted accordingly. In one embodiment, the remaining cycles in the histogram are shifted by one row, if the histogram is recorded in an array. In one embodiment, all cycles are saved in the record of events. In an alternate embodiment, a limited number of cycles are saved. In that instance, in one embodiment when the maximum number of cycles is reached, the oldest cycle in the record of events is discarded upon storage of the most recent record of events.

At block 620, the event histogram is collapsed. The collapsed histogram differentiates periods of activity and inactivity. The histogram is collapsed in one embodiment by scanning backward through the histogram and creating a mathematical union of all event occurrences. The resulting pattern is a cyclical summary of times when sensor inputs have occurred in recent history. In one embodiment, conditional logic is used to create the mathematical union. In an alternate embodiment, a summation is used to create the mathematical union. In another alternate embodiment, a binary OR is used to create the mathematical union. One embodiment of the event histogram collapse is described in conjunction with FIG. 10.

At block 630, the collapsed histogram is passed through a low-pass filter. The low-pass filter removes any high frequency (short duration) oscillations from the collapsed histogram in order to remove any sporadic activity. One embodiment of the low-pass filter is described in conjunction with FIG. 11. The resulting collapsed histogram is therefore an approximation of continuous periods of activity. The process then ends. This collapsed histogram is used to generate markers.

Figure 7:
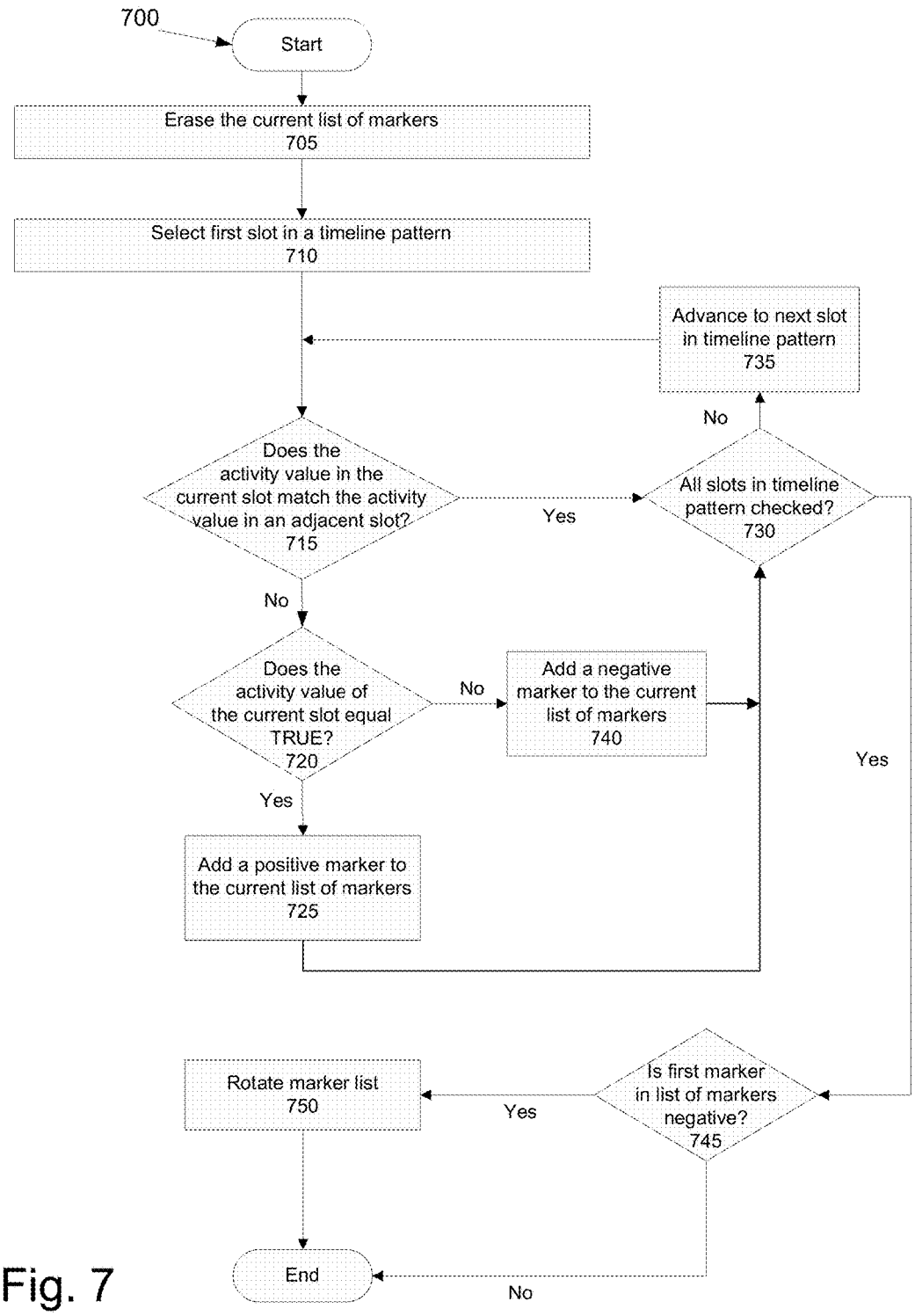
FIG. 7 illustrates a flowchart of a marker generation method in accordance with embodiments of the present invention.

FIG. 7 illustrates a flow diagram of a marker generation method in accordance with embodiments of the present invention. In one embodiment, markers are positioned at each phase transition of the pattern and each marker is assigned a polarity corresponding to whether it occurs on the rising or falling edge of the pattern. The process 700 begins at block 705 where in one embodiment the current list of markers is erased. In one embodiment, this occurs on every cycle, when the marker locations are re-evaluated. In another embodiment, the markers are not erased.

At block 710, the first slot in a timeline pattern is selected. The first slot is examined at block 715 to determine whether the activity value in the current slot matches the activity value in an adjacent slot. This determines whether there is a transition in the pattern.

If the activity value in the current slot matches the activity value in an adjacent slot at block 715, the process continues to block 730. At block 730, it is determined whether all slots in the timeline pattern have been checked. If the slots have all been checked, the process continues to block 745. If all the slots have not been checked, the process continues to block 735, where the process advances to the next slot in the timeline pattern. If all the slots have been checked, the process continues to block 745.

If the activity value in the current slot does not match the activity value in the subsequent slot, the process continues to block 720. At block 720, the process determines whether the activity value of the current slot is TRUE. In one embodiment, the activity value of the current slot is TRUE if there is an indication of an event in the current slot. If the activity value of the current slot is TRUE, a positive marker is added to the current list of markers at block 725. The process then proceeds to block 730, as described above. If the activity value of the current slot is not TRUE, a negative marker is added to the current list of markers at block 740 and the process proceeds to block 730, to determine if all slots have been checked, as described above. In one embodiment, the activity value of the current slot is not TRUE if there is no indication of an event in the current slot.

After all slots have been checked, in one embodiment the process continues to block 745. At block 745, a determination is made whether the first marker in the list of markers is negative. If it is not, the process ends. If the first marker is negative, the process continues to block 750, where the marker list is rotated. In one embodiment, the marker list is rotated by inverting all of the markers in the list, such that the marker list starts with a positive marker. The process then ends. The result of this process is a set of markers each of which is labeled as positive or negative.

Figure 8:
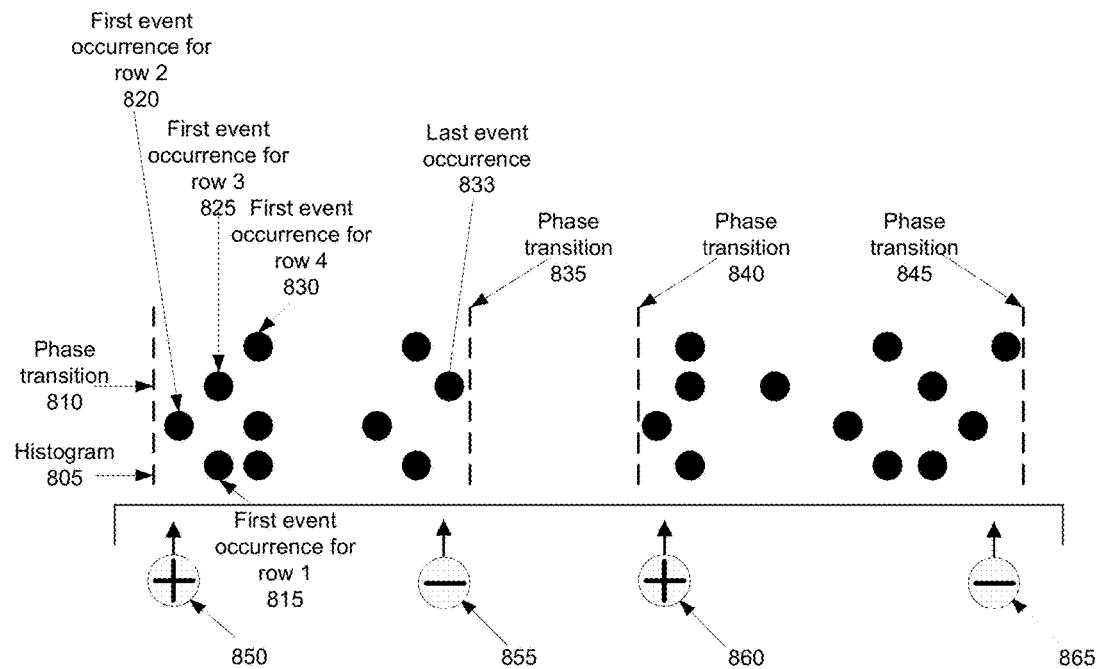
FIG. 8 illustrates a marker adjustment method in accordance with embodiments of the present invention.

FIG. 8 illustrates a marker adjustment method in accordance with embodiments of the present invention. The marker adjustment method applies a time correction algorithm for contributing events. This correction, while still allowing for the influence of outlying events, diminishes this influence on the automation schedule produced. The optional correction re-integrates historical information from the record of events and adjusts the markers to better approximate the real world pattern reflected in the histogram. The correction also compensates for any overestimation of phase changes in the pattern.

In one embodiment, histogram 805 is scanned inward from the outer edge of phase transition 810 until first event occurrence 820 is reached. The first occurrence of an event for each row is then recorded as an influence (815, 820, 825, and 830). In one embodiment, each row in histogram 805 represents a day. In one embodiment, the times of each of event occurrence 815, 820, 825, and 830 within one segment are averaged and marker 850 is repositioned according to the average time of event occurrences 815, 820, 825, and 830. In one embodiment, the adjustment method uses the actual time recorded for an event as its basis. In another embodiment, the slot-time is used.

In another embodiment, the location of a marker is adjusted according to the first event occurrence for each row for a positive phase transition in one embodiment. Thus, the marker 850 is aligned with phase transition 810, as indicated by first event 820. In one embodiment, each marker is approached from the outside inward, so that the "first" from the outside marker is the controlling marker. In another embodiment, the location of a marker is adjusted according to the last event occurrence for each row for a negative phase transition. Thus, marker 855 is aligned with phase transition 835, based on last event occurrence 833. In this way, the location of each marker is adjusted to encompass the space.

Figure 9A:
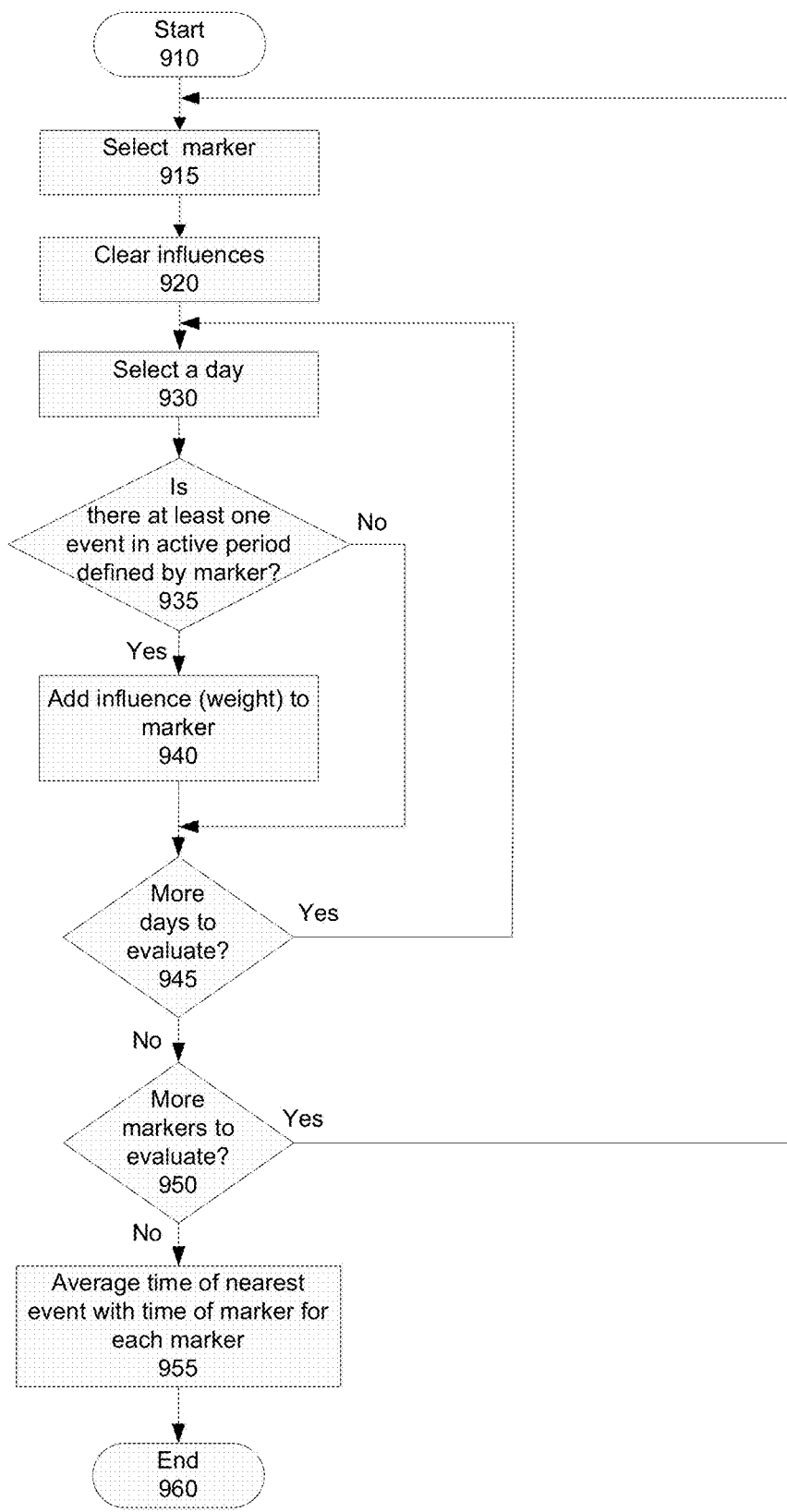
FIG. 9A illustrates a flowchart of weight assignment for a marker in accordance with embodiments of the present invention.

FIG. 9A illustrates a flowchart of weight assignment for a marker in accordance with embodiments of the present invention. The process starts at block 910. At block 915, a marker is selected. In one embodiment, a first marker is selected in the timeline to be evaluated.

At block 920, existing influences on the marker are cleared. The influences are previously calculated location consistency evaluations and assigned weights, in one embodiment.

At block 930, a first day is selected. In one embodiment, this evaluation is done for a range of days. The range of days, in one embodiment, is one week. Alternative ranges of dates for which this evaluation is performed may be used.

At block 935, the process determines whether there is at least one event in the active period defined by the marker. The active period defined by a positive marker is the period between the positive marker and the subsequent negative marker (e.g. the time period during which event activity tends to occur). The active period defined by a negative marker is the period between the negative marker and the prior positive marker (e.g. the time period during which event activity tends to occur.)

If there is at least one event in the active period, influence is added to the marker at block 940. Influence indicates the time consistency as well as weight of the marker, (e.g. the level of confidence in the time and likelihood of the period defined by the marker). The process then continues to block 945. If there is no event in the active period, the process directly continues to block 945. In another embodiment, if there are no events within the active period, influence may be subtracted from the marker.

At block 945, the process determines whether there are more days to evaluate in the range of days being used to influence the marker. If there are more days to evaluate, the process returns to block 930, and selects a next day to evaluate. If there are no more days to evaluate, the process continues to block 950.

At block 950, the process determines whether there are any more markers to check. If there are more markers, the process returns to block 915, to select a next marker. Otherwise, the process continues to block 955.

At block 955, for each marker, for each day, the time of the marker is averaged with the time of the nearest event. Thus, for each positive marker, the event that is closest to the marker each day (e.g. the first activity detected within the active period) is used to average the time for the marker. Similarly, for each negative marker, the event that is closest to the marker each day (e.g. the last activity detected within the active period) is used to average the time for the marker. The process then ends.

Figure 9B:
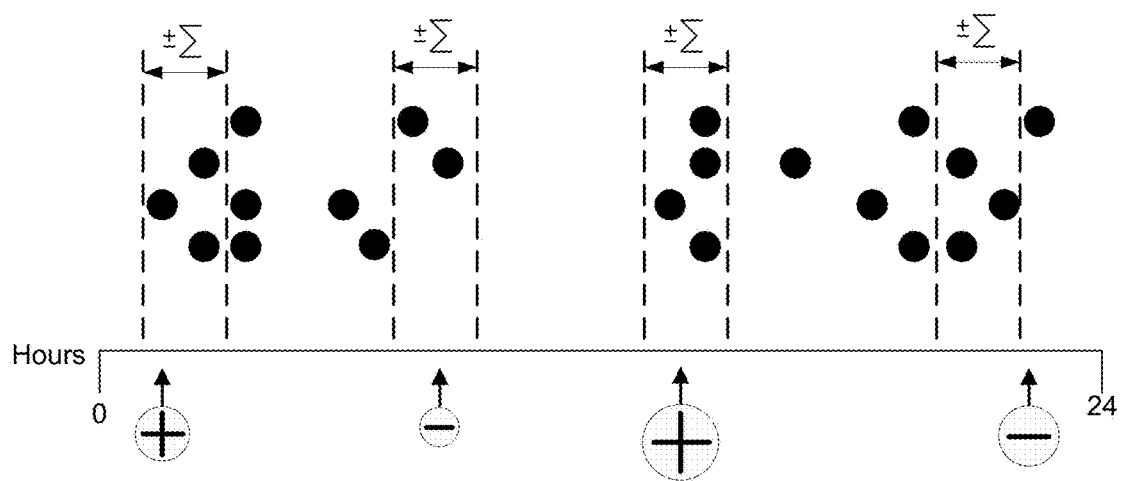
FIG. 9B illustrates a weight assignment method in accordance with embodiments of the present invention.

FIG. 9B illustrates weight assignment for a marker in accordance with embodiments of the present invention. Event histogram 970 is used to determine the nearness of historical events to the established marker positions. In one embodiment, the closer in time the influencing events are to a marker position, the greater the weight assigned to the marker. The more scattered events are, the lighter the marker. The histogram is scanned for events that occur within a time range of the established marker position. In FIG. 9B, the size of the marker indicates its weight. This is only a visual illustration, however. In one embodiment, a mathematical summation of events within this range, using a value in proportion to the distance of each event from the established marker position, is used to compute the marker weight. It is apparent that markers where consistency in the event record is tight will have higher weight while those where consistency is loose will have lower weight. Furthermore, events that occur as outliers in the record will contribute little to no increase in weight. This, in effect, establishes a level of confidence, approximated by weight, of the position of each marker along the timeline.

Figure 10:
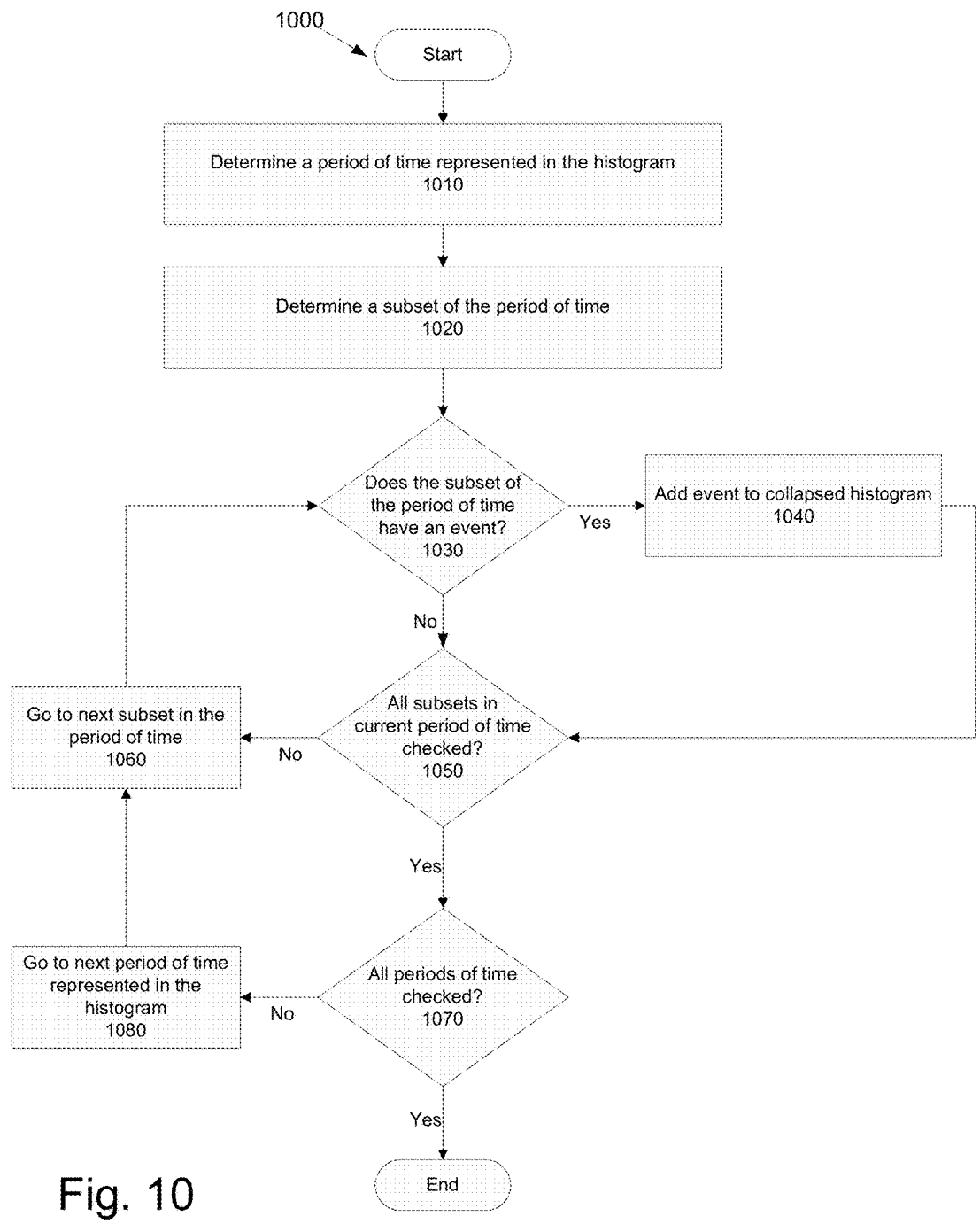
FIG. 10 illustrates a flowchart of an event histogram collapsing method in accordance with embodiments of the present invention.

FIG. 10 illustrates a flowchart of collapsing event histogram in accordance with embodiments of the present invention. Process 1000 starts at block 1010 and determines a period of time represented in the histogram. In one embodiment, each row of the histogram represents a period of time, and is considered a set containing events. In one embodiment, the period of time represented in the histogram is one day.

The process continues to block 1020, and determines a subset of the period of time. In one embodiment, the subset of time is a slot in the histogram, as described above. In an alternate embodiment, the subset of time is an hour in the day. As noted above, the length of time selected may vary across the day.

At block 1030, the process determines if the subset of the period of time contains an event. If there is an event in the subset of the period of time, the event is added to the collapsed histogram at block 1040. The process then proceeds to block 1050. If there is no event in the subset of the period of time, the process continues to block 1050.

At block 1050, the process determines whether all the subsets in the current period of time have been checked. If all the subsets have not been checked, the process continues to block 1060.

If all the subsets have been checked, the process continues to block 1070 to determine whether all periods of time have been checked. If all periods of time have been checked, the process ends with a collapsed histogram.

If all the periods of time have not been checked, the process continues to block 1080 and goes to the next period of time represented by the histogram. The process then continues to block 1060.

At block 1060, the process goes to the next subset in the period of time and proceeds to block 1030 to determine whether that subset of the period of time has an event.

Figure 11:
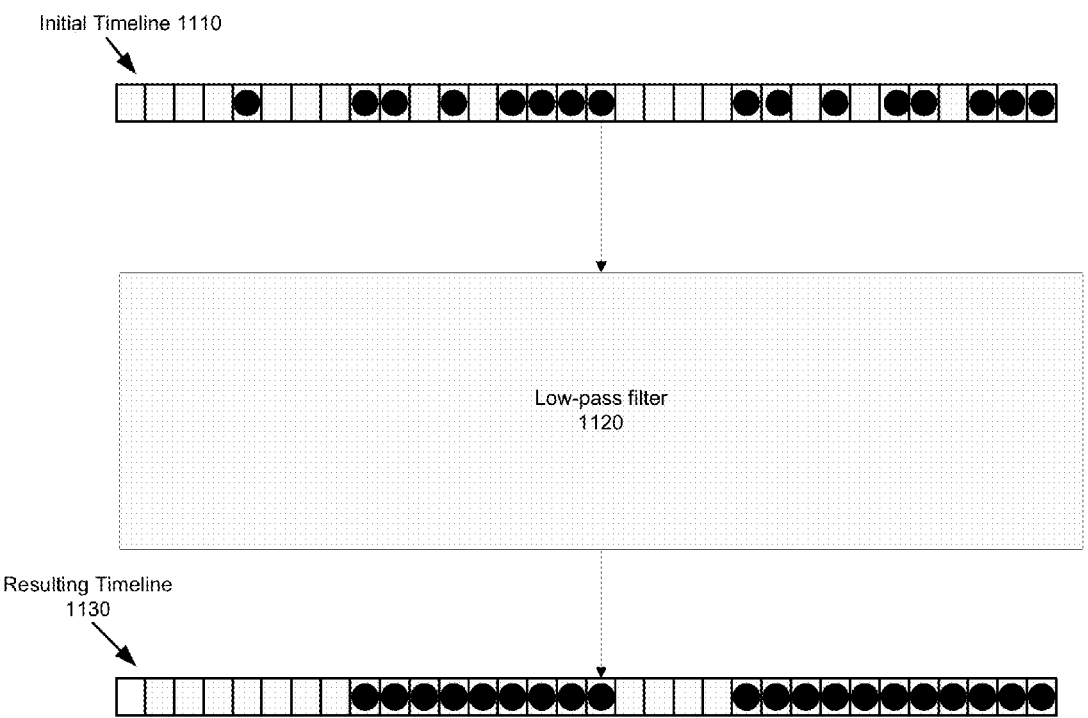
FIG. 11 illustrates a low-pass filtration method in accordance with embodiments of the present invention.

FIG. 11 illustrates a low-pass filtration method in accordance with embodiments of the present invention. Initial timeline 1110 is input into low-pass filter 1120. In one embodiment, initial timeline 1110 is a cyclical binary waveform. In this embodiment, low-pass filter 1120 is used to remove any high frequency, or short duration, oscillations. Low-pass filter 1120 smoothes the pattern into an approximation of continuous periods of events (or activities). In one embodiment low pass filter 1120 removes any single events not clearly surrounded by other events. In one embodiment low pass filter 1120 further inserts events when an empty slot is surrounded by events. In one embodiment, low-pass filter 1120 outputs resulting timeline 1130, which represents the pattern of approximate continuous periods of activities.

Figure 12:
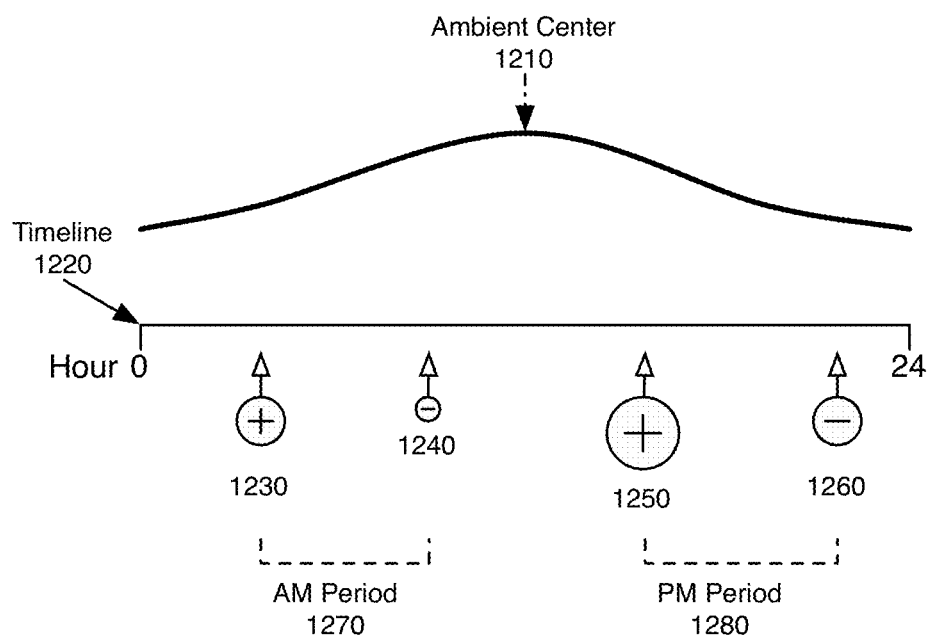
FIG. 12 illustrates a marker qualifying method in accordance with embodiments of the present invention.

FIG. 12 illustrates a marker qualifying method in accordance with embodiments of the present invention. A sequence of established and quantified markers can serve as the basis for reasonable automation by itself. However, in one embodiment, an additional stage of qualifying the markers is used to improve automation. In one embodiment markers are qualified by overlaying external data. In one embodiment, time of day information can be used qualify the nature of periods delineated by the markers. In an alternate embodiment, ambient light can be used qualify the nature of periods delineated by the markers. When the revolving cycle is generated, it is arbitrarily centered, with each position along the timeline representing the time within the cycle rather than the actual time of day.

In one embodiment, the time of day can be obtained. In one embodiment, the programmable device or one of the sensors may include a time of day input facility. In one embodiment, a network connection can be used to obtain the time data. In one embodiment, if actual time is obtained, the center of the timeline is aligned to midday.

In another embodiment, if actual time of day is unknown, ambient sensor data is used to synchronize the markers to the daylight cycle. As illustrated in FIG. 12, aligning ambient center 1210 with the center of timeline 1220 enables approximation of the actual time of day for each position along the timeline. By doing so, markers 1230, 1240, 1250, and 1260 can be further qualified to differentiate between AM period 1270 and PM period 1280.

In another embodiment, artificial illumination detection, or data from light switches indicating when lights are turned on can be used as an alternative to ambient light data to synchronize the markers to the daylight cycle.

Figure 13:
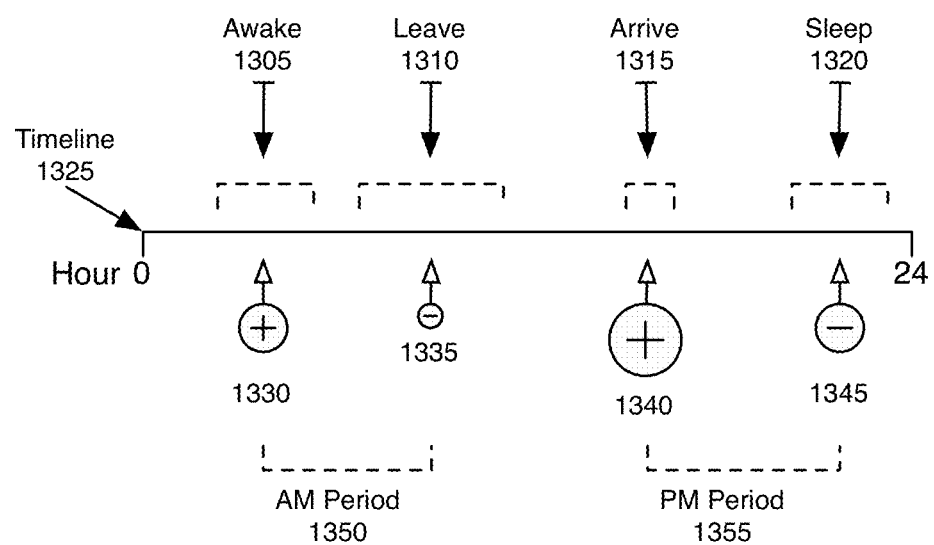
FIG. 13 illustrates a marker labeling method in accordance with embodiments of the present invention.

FIG. 13 illustrates a marker labeling method in accordance with embodiments of the present invention. In one embodiment, markers 1330 and 1335 are qualified as occurring in AM period 1370, and markers 1340 and 1345 are qualified as occurring in PM period 1380. In one embodiment, after the qualification, each marker is labeled in a way that corresponds to the actual usage of the location in which the programming device is located. In one embodiment, polarity in combination with period position is used to determine labels.

In one embodiment, the programming device is located in a residential environment with one or more occupants. In one embodiment, marker 1330 of the AM period corresponds to the time when occupants wake up in a residential environment. In one embodiment, marker 1330 would be labeled Awake 1305. In one embodiment, marker 1335 corresponds to the time when the occupants leave their home in the morning. In one embodiment, marker 1335 would be labeled as Leave 1310.

In one embodiment, marker 1340 corresponds to the time when the occupants return home. In one embodiment, marker 1340 would be labeled as Arrive 1315. In one embodiment, marker 1345 corresponds the time when occupants retire for the night. In one embodiment, marker 1345 would be labeled as Sleep 1320.

In alternate embodiments, there are fewer than or more than two pairs of markers. In one embodiment, a single pair of markers in a residential environment indicates residents who stay at home. In another embodiment, three sets of markers, with the center set occurring during ambient hours, may indicate midday activity, such as having lunch at home, or the arrival of a regularly scheduled cleaning service.

In one embodiment, the absence of markers indicates an extended period of vacancy (e.g. vacation). In one embodiment, previously established markers are preserved during such a time. This enables restoration of predictive behavior upon the first signal of occupancy.

Figure 14:
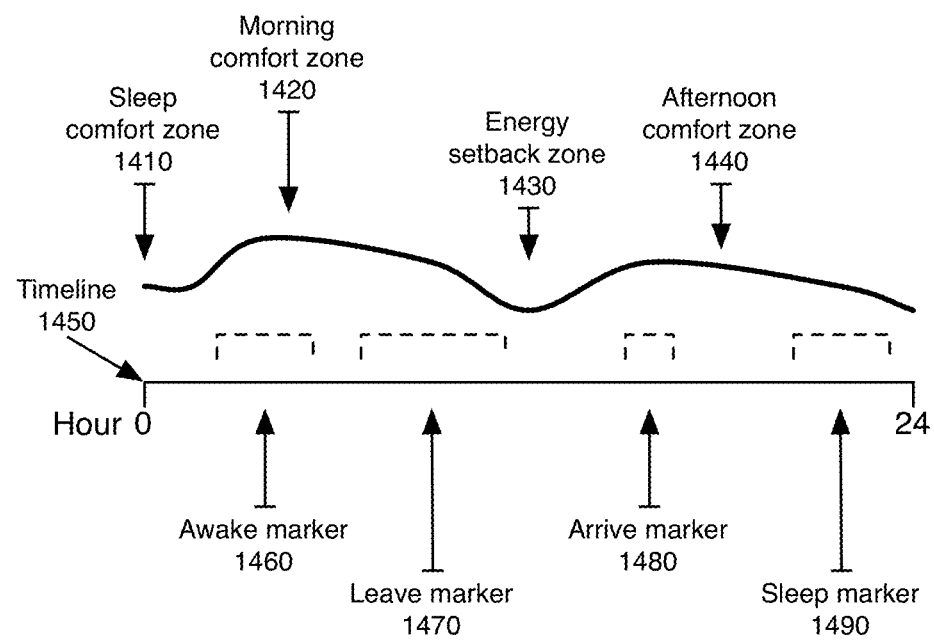
FIG. 14 illustrates an automation method in accordance with embodiments of the present invention.

FIG. 14 illustrates an automation method in accordance with embodiments of the present invention. FIG. 14 specifically illustrates one embodiment of how labeled markers can be used to form an efficiency profile with which to drive automation of a programmable device. In this embodiment, the programmable device is a temperature control device driven by a schedule, as illustrated by timeline 1450, scheduled based on markers 1460, 1470, 1480, and 1490. The time between the Sleep marker 1490 and Awake marker 1460 is set to a sleep comfort zone 1410, where the temperature is steadily adjusted downward in order to facilitate better rest as well as energy savings in a cold environment where heating is otherwise utilized. Just prior to Awake marker 1460, the temperature is adjusted upward to morning comfort zone 1420 to restore comfort in anticipation of the occupants rising for the day. In a similar manner, the temperature is adjusted down to energy setback zone 1430 between Leave marker 1470 and Arrive marker 1480 in order to reduce heating and save energy. In anticipation of the occupants returning, the temperature is adjusted to afternoon comfort zone 1440 at Arrive marker 1480. Although this example focuses on a residential heater/cooler, similar adjustments could be used to control pool temperature, water temperature, irrigation, appliances, or other systems within the home, office, or other work environments.

In managing automation, in one embodiment two additional factors may be considered as part of the profile. First, the weight of each marker, and the corresponding tolerance, may, in one embodiment, be used to time the transition from one mode to the next. Specifically, adjustments may be made significantly prior to approaching lightly weighted markers (those with loose tolerances) while adjustments can be at the last minute when approaching heavily weighted markers (those with tight tolerances).

Secondly, the distance between markers is considered in one embodiment when computing the magnitude of adjustment. Rapid changes, particularly in temperature, may be perceived as uncomfortable. This implies that the extent of drift is constrained in one embodiment such that a maximum rate of change is enforced between markers. That is, the temperature change, in one embodiment, is set so that when the marker is reached, the changes in temperature will either not be perceived, or will be perceived as comfortable, by residents. In one embodiment, for qualified markers, a temperature adjustment may be more rapid for times when the marker indicates that the residents are away.

Timeline markers are sufficient to drive automation, such as set-back control for heating and cooling. However, timeline markers can be combined with additional external information to further optimize the resulting automation. For instance, it may be desirable to price-optimize air conditioning (cooling) on hot days in an environment of variable energy prices. Other optimization may include using weather data to predictively alter the settings to compensate for an incoming cold-front, or storm, using time change data to predict a behavioral change based on daylight savings time, or use of other available information to alter settings beyond the derived timeline markers.

Figure 15A:
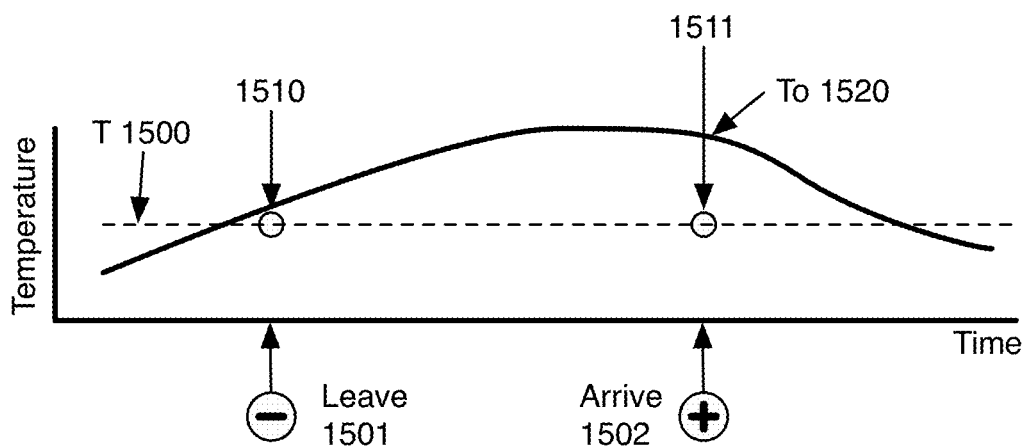
FIG. 15A-F illustrate curves showing adjustment for external data.

FIG. 15A illustrates a projected situation. Temperature level 1500 is the target internal building temperature (T) desired by occupants. In one embodiment, it can be predetermined. In another embodiment, it is set by occupants. In yet another embodiment, it is derived from a record of occupant temperature preferences. Timeline markers 1501 and 1502, established by the described method, indicate when occupants leave the building and return. In one embodiment, a predicted outside temperature profile 1520 has been overlaid using external weather data ($T_o$).

In one embodiment, the goal of the automation is to allow the inside temperature to passively drift away from the target temperature level (T), in order to save energy while occupants are absent, and then to actively restore the temperature to the target level (T) by the time the occupants arrive back. Two points, 1510 and 1511, show intersections of the timeline markers and the target temperature level 1500. In one embodiment, drift is allowed between these two points.

Figure 15B:
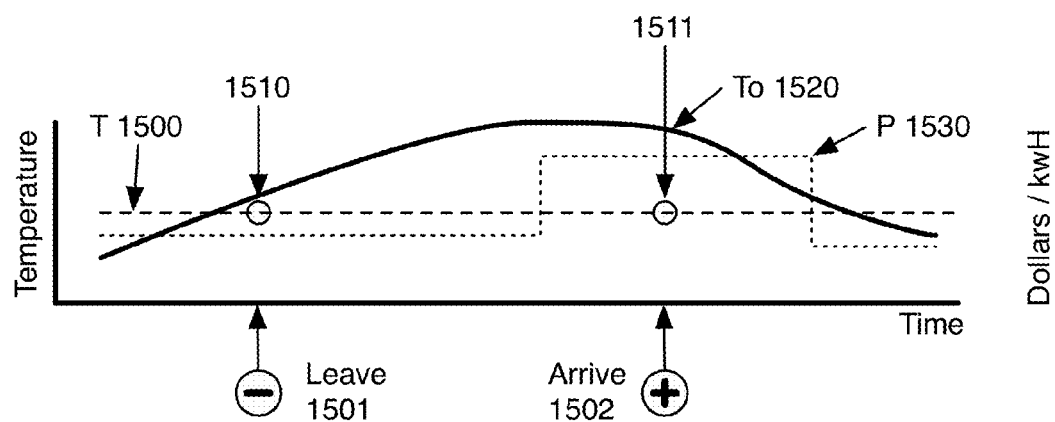

For illustrative purposes, the situation can be further complicated by the presence of variable energy prices throughout the day. FIG. 15B illustrates the same graph supplemented with price levels 1530, using energy pricing data (P). In one embodiment pricing data is made available to the system by a digital smart electrical utility meter. In another embodiment, pricing data is provided over the Internet. In yet another embodiment, the data is derived from a Demand Response signal provided by a utility. In the illustrated scenario, the price of energy escalates during the peak usage hours in the afternoon. This coincidentally occurs near to the expected arrival time of the occupants.

In one embodiment, optimizing the energy saving period between the markers for cost can be achieved using an iterative process. A finite sequence of possible drift-drive profiles can be computed using approximate known values representing the rate of temperature drift for the building and the rate at which temperature can be restored within the building. In one embodiment, these rates are derived from historical data. In another embodiment, these rates are correlated to outside temperature. In yet another embodiment, these rates are looked up from a table. Given a sequence of profiles, the system will select that profile which incurs minimal cost. In one embodiment, the profile may be adjusted based on actual sensor data.

Figure 15C:
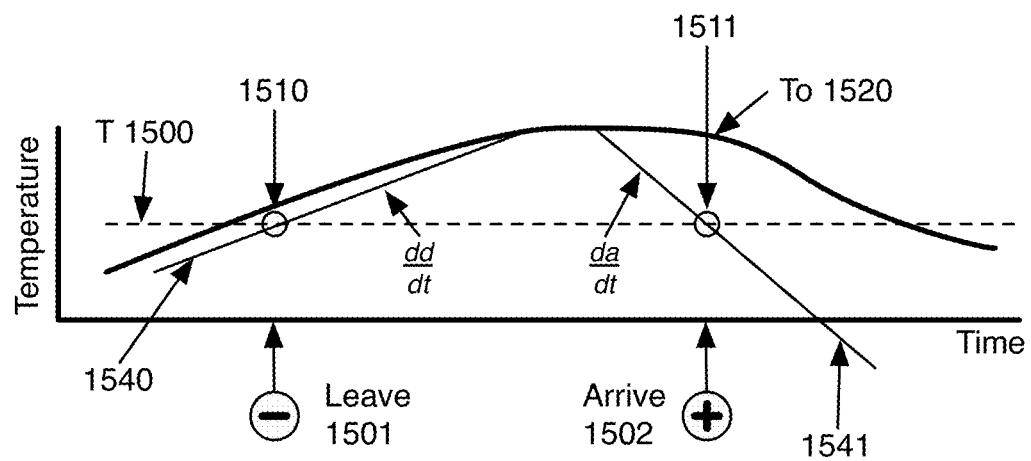

FIG. 15C illustrates a first example profile. The rate at which the internal temperature drifts toward the outside temperature 1520, over time, is a first order derivative (dd/dt). The rate at which internal temperature can be restored to the target temperature 1520, over time, is a first order derivative (da/dt). In one embodiment, these rates are assumed. In another embodiment, these rates are retrieved from a table. In yet another embodiment, these rates are derived from a past temperature readings. In a further embodiment, these rates are correlated to outside temperature. In one embodiment, a combination of the above factors along with specification data, either provided or derived based on observed changes, of the installed HVAC (heating, ventilating, and air conditioning) system may be used to calculate these rates.

A restoration line 1541 is plotted with slope (da/dt), such that it intersects arrival temperature point 1511. A drift line 1540 is plotted with slope (dd/dt), such that it intersects leave temperature point 1510. Together with the predicted outside temperature data, these lines form an approximation of the internal temperature over time as the temperature is allowed to drift and then is restored.

Figure 15D:
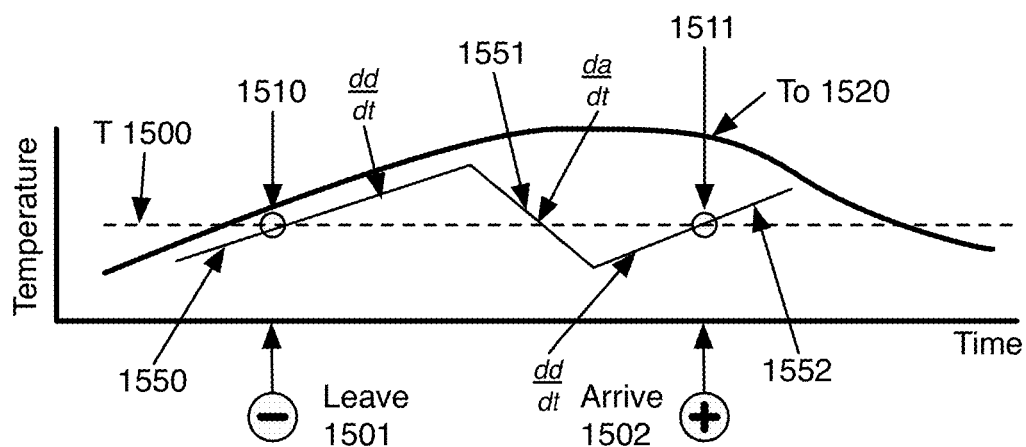

FIG. 15D illustrates a second example profile using similar rates of drift and restoration. In one embodiment, the restoration point is shifted back by an increment, such that the temperature is first allowed to drift 1550, then is driven to a point below the target temperature 1551 and then finally allowed to drift back to the final temperature 1552. Lines 155 and 1552 are plotted such that they intersect the two points 1510 and 1511. The process of shifting the restoration back can be repeated until a complete sequence of possible profiles is established. Once a list of profiles is determined, the automation process can perform a cost analysis of each.

In one embodiment, the profiles are plotted such that they intersect points, time aligned with markers. In another embodiment, profiles are plotted such that they intersect a range of time around a marker, derived from the weight of the marker.

Figure 15E:
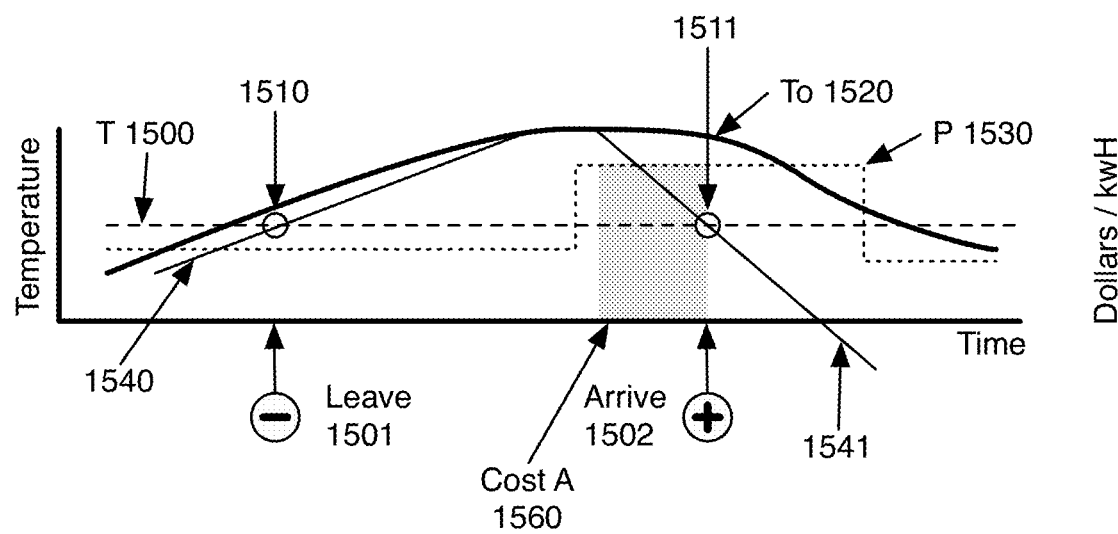
Figure 15F:
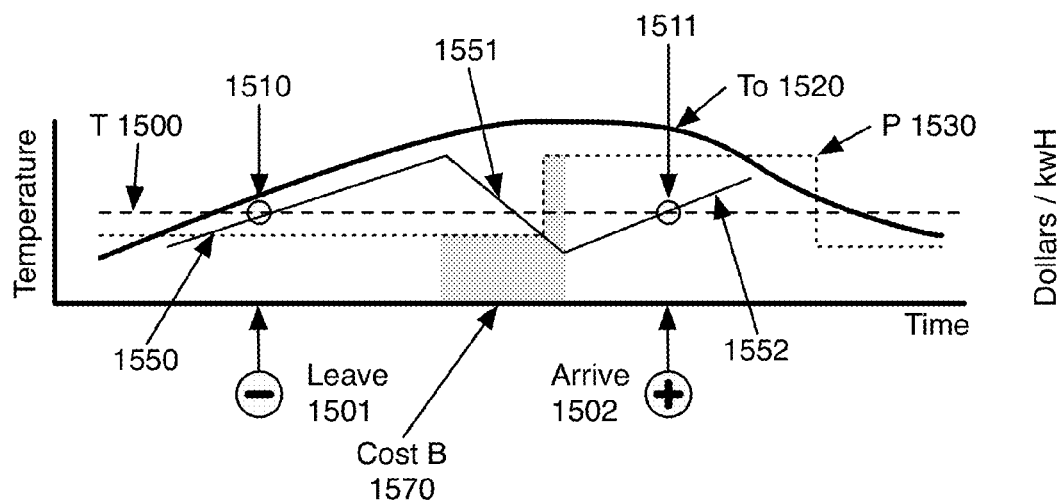

FIG. 15E illustrates the cost analysis given the first computed profile. Here the cost is computed by incorporating the dynamic energy price data 1530 into the temperature profile derived from lines 1540 and 1541. The cost 1560, shown in gray, is the area under the energy price data curve 1530, where the curve intersects line 1541 (i.e. when the cooling system is utilized and temperature is being driven). FIG. 15F illustrates the same cost analysis given the second computed profile. Cost 1570, shown in gray, is the area under the energy price data curve 1530, where the curve intersects line 1551. As illustrated by example, it is possible to save cost by shifting the drive time earlier than needed to meet arrival time, or driving the temperature slightly below the target temperature.

The example scenario is provided for illustrative purposes. Those skilled in the art will recognize that different conditions will result in different outcomes. However, given a set of timeline markers combined with supplemental external data, it is clear that the proposed method can optimize not only for the appropriate temperatures, but also for minimum cost. In one embodiment, the method includes plotting multiple profiles to predict automation results and then selecting the profile which best achieves the desired result.

FIG. 15G shows a heat index chart showing the interaction between humidity and temperature perception. In an environment where adaptive automation modules may control humidity and temperature, this can become relevant. For example, adjustments to the humidity by using a humidifier, or dehumidifier, may have an effect on the residents' perception of an appropriate setting for a heater or air conditioning unit. The humidity level changes how humans perceive temperature. A standard temperature sensor measures absolute temperature, and not heat index. It is therefore apparent that information from a humidity sensor, or information from an adaptive automation module which controls humidity, may provide its data to the adaptive automation module controlling the heater/cooler system. In this way, data from an external device, another adaptive automation module and/or sensors coupled to an adaptive automation module, may be used to adjust the controller settings selected by the markers, described above.

Figure 16:
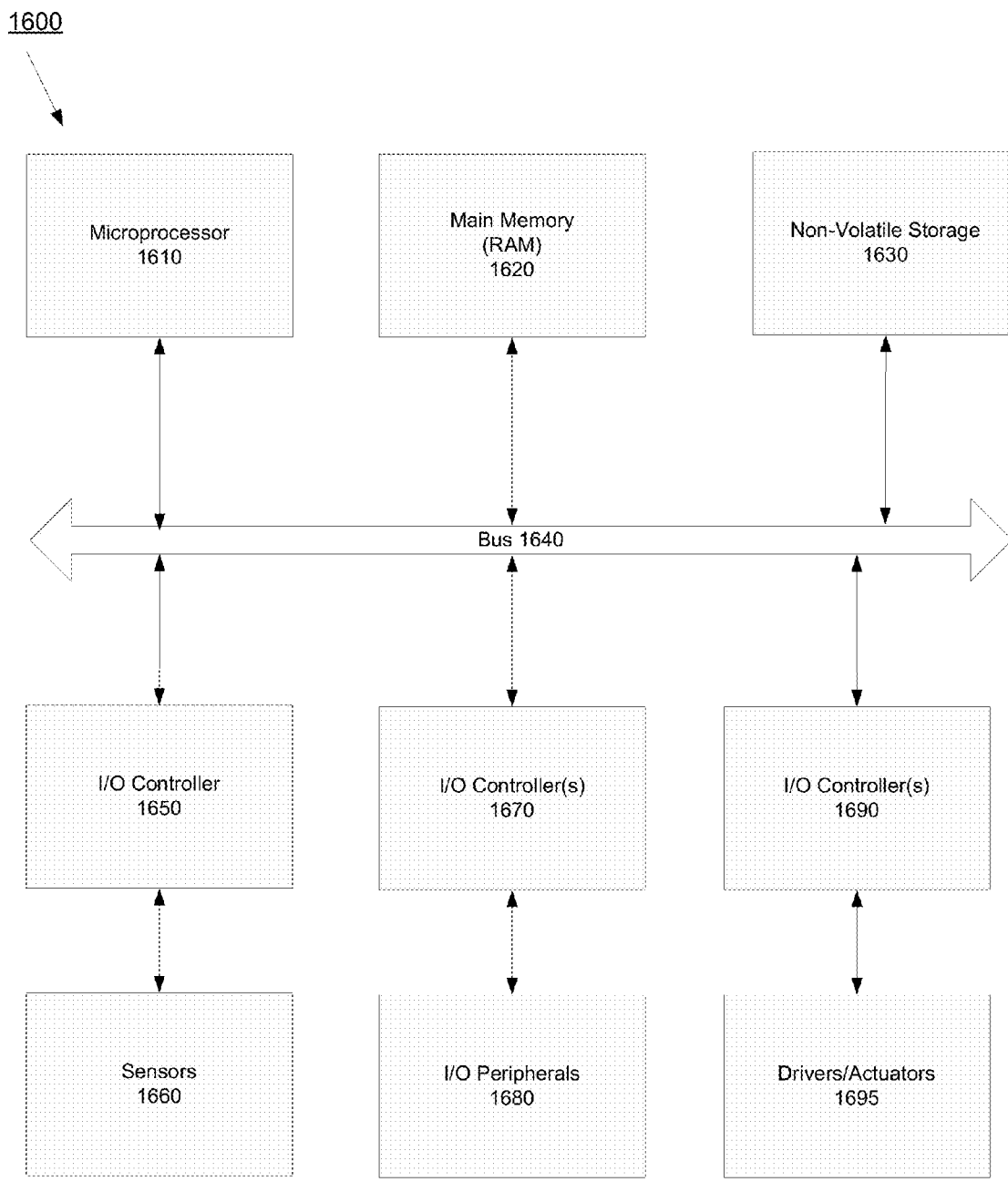
FIG. 16 illustrates a block diagram of an exemplary computer system in which embodiments of the present invention may operate.

FIG. 16 is a block diagram of an exemplary computer system in which embodiments of the present invention may operate. Computer system 1600 includes microprocessor 1610, main memory (RAM) 1620, non-volatile storage 1630, bus 1640, I/O controller 1650, sensors 1660, I/O controller 1670, and I/O peripherals 1680.

Main memory 1620 encompasses all volatile or non-volatile storage media, such as dynamic random access memory (DRAM), static RAM (SRAM), or flash memory. Main memory 1620 includes storage locations that are addressable by the microprocessor 1610 for storing computer program code and data structures for the verification of the software to be installed. Such computer program code and data structures also may be stored in non-volatile storage 1630. Non-volatile storage 1630 includes all non-volatile storage media, such as any type of disk including floppy disks, optical disks such as CDs, DVDs and BDs (Blu-ray Disks), Flash memory, and magnetic-optical disks, magnetic or optical cards, or any type of media, and may be loaded onto the main memory 1620. Those skilled in the art will immediately recognize that the term "computer-readable storage medium" or "machine readable storage medium" includes any type of volatile or non-volatile storage device that is accessible by a processor (including main memory 1620 and non-volatile storage 1630).

Microprocessor 1610 is coupled to main memory 1620 and non-volatile storage 1630 through bus 1640. Microprocessor 1610 includes processing elements and/or logic circuitry configured to execute the computer program code and manipulate the data structures. It will be apparent to those skilled in the art that other processing and memory means, including various computer readable storage media, may be used for storing and executing computer program code pertaining to verifying the software to be installed.

Microprocessor 1610 can retrieve instructions from main memory 1620 and non-volatile storage 1630 via bus 1640 and execute the instructions to perform operations described below. Bus 1640 is coupled to I/O controller 1650. I/O controller 1650 is also coupled to sensors 1660. In one embodiment, sensors 1660 may include one or more motion sensors to provide motion context in a location which includes a programmable device. In alternate embodiments, sensors 1660 include a barometric sensor, a proximity sensor, an ambient light sensor, a light switch sensor, or other sensors.

Bus 1640 is further coupled to I/O controller(s) 1670. I/O controller(s) 1670 are coupled to I/O peripherals 1680, which may be mice, keyboards, modems, network interfaces, printers and other devices which are well known in the art.

I/O controller(s) 1690 may further be coupled to drivers/actuators which allow the system to control a programmable device.

In practice, the methods as described herein may constitute one or more programs made up of computer-executable instructions. Describing the method with reference to the flow diagrams above enables one skilled in the art to develop such programs, including such instructions to carry out the operations (acts) represented by logical blocks on suitably configured computers (the processor of the computer executing the instructions from computer-readable media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems.

The methods as described herein are not described with reference to any particular programming language. It will be appreciated that a variety of programming languages may be used to implement the teachings of the present invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be further appreciated that more or fewer processes may be incorporated into the methods described above respectively without departing from the scope of the invention and that no particular order is implied by the arrangement of blocks shown and described herein.

The foregoing description has been directed to particular embodiments of the disclosure. However, it will be apparent that other variations and modifications may be made to the described embodiments with the attainment of some or all of their advantages.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method for automation of an environmental controller comprising:
   receiving an event from a sensor, the event indicating a presence or absence of a person;
   recording a timeline pattern based on a plurality of the events received from the sensor, the timeline pattern reflecting times of day associated with the plurality of events;
   establishing a marker on the timeline pattern based on the record of events, the marker delineating a transition within the timeline pattern;
   adjusting the position of the marker to reflect variation in the timeline pattern to approximate location consistency of the events in the timeline;
   computing a weight for the marker that reflects time consistency of the events, the marker being more heavily weighted for consistently timed transitions, the computing comprising assigning the weight to the marker based on a proximity of one or more events occurring within a time range of the marker; and
   subsequently triggering output based on the marker to adjust settings of the environmental controller based on the expected transition indicated by the marker.

2. The method of claim 1, wherein the recording of the timeline pattern further comprises:
   archiving the plurality of events from the sensors into an event histogram; and
   collapsing the event histogram to create the timeline pattern.

3. The method of claim 1, wherein the sensor indicates presence of a device associated with the person.

4. The method of claim 3, wherein the sensor provides data to the controller using a network.

5. The method of claim 1, further comprising:
   associating the events with external data comprising at least one of: time of day information, ambient light information, weather information, pricing information, and demand response data.

6. The method of claim 1, wherein the weight for the marker is computed based on a time range of the marker and a number of events within the time range of the marker.

7. The method of claim 1, wherein establishing a new marker comprises, for each slot in the timeline pattern comprising a plurality of slots:
   determining whether an activity value for a current slot in the timeline pattern matches an activity value for a subsequent slot in the timeline pattern; and
   adding the new marker to the timeline when the activity value for the current slot and the activity value for the subsequent slot do not match.

8. The method of claim 1, wherein adjusting the marker further comprises:
   scanning the record of events for at least one event occurring after the marker and prior to a next marker;
   recording a time of the at least one event;
   computing an average time for the marker based on the time of the at least one event; and
   repositioning the marker based on the average time.

9. A computer-implemented adaptive automation module comprising:
   memory including an event recorder to store one or more events for a predetermined period, each event based on data from a sensor indicating a presence or absence of a person;
   microprocessor including a timeline pattern generator logic to create a timeline for the predetermined period;
   the microprocessor including a marker creator logic to generate a marker to create an intermediate data set from an event data represented by the timeline data, the marker representing transitions, wherein the microprocessor uses the marker for controlling a device, the device used to adapt an environment for the person, the marker creator logic further comprising a marker adjuster to adjust a location of the marker on the timeline based on the one or more events, wherein the marker adjustor scans the one or more events for an outlier event occurring near the marker, and computes an adjusted time for the marker based on a time of the outlier event.

10. The module of claim 9, wherein the marker creator logic comprises:
   a marker generator to generate the marker based on the transitions as indicated by the one or more events on the timeline;
   a marker weight assignor to assign a weight to the marker, based on a time range of the marker and a number of events within the time range of the marker.

11. The module of claim 10, wherein the timeline comprises a plurality of slots, and the module further comprising:
   the marker generator evaluating each of the plurality of slots in the timeline, determine whether an activity value matches the activity value for a subsequent slot in the timeline pattern, and add a marker to a list of markers if the activity value for the current slot and the activity value for the next slot do not match.

12. The module of claim 10, further comprising:
   the marker weight assignor is further to identify in-range events occurring within a time range of a marker, and assigning the weight to the marker based on a proximity of the in-range events to the marker.

13. The module of claim 9, wherein the data from the sensor is received via a network.

14. The module of claim 9, further comprising:
   the module to broadcast automation decisions made based on the intermediate data set.

15. The module of claim 9, further comprising the timeline pattern generator logic generating an event histogram based on the one or more events, and collapsing the event histogram to create the timeline.

16. The module of claim 9, further comprising a low pass filter to remove short duration events from the timeline.

17. The module of claim 9, further comprising:
   the marker creator to associate the marker with external data comprising at least one of: time of day information, ambient light information, weather information, pricing information, and demand response data.

18. A adaptive automation module comprising:
   a receiver to receive data from one or more sensors, the data indicating a presence or an absence of a person within a space;
   a storage medium to store the data;
   a processor associated with the storage medium and configured to:
      create a timeline pattern based on a record of events, the record of events derived from the data;
      generate an intermediate data set of markers from the timeline pattern, the markers adjusted to indication locations on the timeline pattern with consistent transitions, based on the record of events;
      assign a weight to the marker based on a time range of the marker, a number of events within the time range of the marker, and a proximity of the in-range events to the marker; and
      use the markers to control the adaptive automation module.

* * * * *